(12) United States Patent
Cheng et al.

(10) Patent No.: US 9,575,396 B2
(45) Date of Patent: Feb. 21, 2017

(54) ELECTRONIC DEVICE AND CONTROL METHOD THEREOF

(71) Applicants: BEIJING LENOVO SOFTWARE LTD., Beijing (CN); LENOVO (BEIJING) LIMITED, Beijing (CN)

(72) Inventors: Fei Cheng, Beijing (CN); Xiaodan Zhang, Beijing (CN); Zhurong Fu, Beijing (CN); Yanjiang Hu, Beijing (CN); Yuling Wei, Beijing (CN)

(73) Assignees: BEIJING LENOVO SOFTWARE LTD., Beijing (CN); LENOVO (BEIJING) LIMITED, Beijing (CN)

( * ) Notice: Subject to any disclaimer, the term of this patent is extended or adjusted under 35 U.S.C. 154(b) by 67 days.

(21) Appl. No.: 14/640,914

(22) Filed: Mar. 6, 2015

(65) Prior Publication Data

US 2016/0070157 A1    Mar. 10, 2016

(30) Foreign Application Priority Data

Sep. 9, 2014  (CN) .......................... 2014 1 0456959
Sep. 28, 2014  (CN) .......................... 2014 1 0509742

(51) Int. Cl.
G03B 21/14    (2006.01)
H04N 9/31    (2006.01)

(52) U.S. Cl.
CPC .......... *G03B 21/142* (2013.01); *G03B 21/145* (2013.01); *H04N 9/3173* (2013.01)

(58) Field of Classification Search
CPC ... G03B 21/142; G03B 21/145; G03B 21/208; H04N 9/3135; H04N 9/3194; H04N 9/312
See application file for complete search history.

(56) References Cited

U.S. PATENT DOCUMENTS

| | | | | |
|---|---|---|---|---|
| 2004/0257535 | A1* | 12/2004 | Tanaka ................. | H04N 5/7458 353/31 |
| 2005/0259226 | A1* | 11/2005 | Gilg ..................... | H04N 9/3185 353/69 |
| 2006/0109431 | A1* | 5/2006 | Hama .................... | G03B 21/10 353/102 |
| 2007/0263176 | A1* | 11/2007 | Nozaki .................. | G03B 29/00 353/69 |
| 2010/0053558 | A1* | 3/2010 | Yanagisawa ......... | G03B 21/142 353/20 |
| 2011/0310364 | A1* | 12/2011 | Wakabayashi ....... | G03B 21/142 353/101 |

* cited by examiner

Primary Examiner — Sultan Chowdhury

(57) ABSTRACT

The disclosure provides an electronic device comprising a projector. The projector comprises: a projection module comprising a lens for projection, and a motor, wherein the motor is operable to rotate the lens of the projection module, in order to adjust an orientation of a projection by the projection module. Meantime, the disclosure also provides a control method for this electronic device.

17 Claims, 19 Drawing Sheets

ELECTRONIC DEVICE AND CONTROL METHOD THEREOF

TECHNICAL FIELD

The present disclosure relates to the field of electronic techniques, and particularly to an electronic device and control methods thereof.

BACKGROUND

Many of the existing electronic devices (e.g. portable notebook computer, smart phone, tablet computer, etc.) have a projection function. However, this projection function can be used conveniently only when the electronic device is in some specific usage state (also referred as a usage mode). This specific usage state requires the electronic device to keep in a certain posture, and if the electronic device changes to another posture, the screen projected by the projector might be deflected so that the user cannot conveniently watch the projection screen.

An electronic device such as a tablet computer usually has its own bracket which, when opened by the user, supports the standing-up mode of the tablet computer. The back-mounted camera of the tablet computer is usually installed near the location of the bracket. With the improvement of the quality of the camera, the field of view (FOV) of the camera enlarges more and more. In case the bracket is opened, it usually appears in the FOV scope of the camera and affects the image effect, and thus causes a worse user experience.

SUMMARY

Embodiments of the application provide an improved electronic device and control methods thereof.

According to a first aspect of the disclosure, a control method applied to an electronic device is provided. The method comprises: obtaining posture information of the electronic device using a posture sensor when the electronic device is in a projection mode; and driving a motor module according to the posture information detected by the posture sensor, in order to rotate a lens in a projection module to adjust an orientation of a projection by the projection module.

According to a second aspect of the disclosure, an electronic device is provided. The electronic device comprises a projection module having a lens for projection, a posture sensor for obtaining posture information of the electronic device and a motor module. The electronic device further comprises a processor, which is configured to trigger the posture sensor to obtain posture information of the electronic device in a projection mode, and to drive the motor module according to the posture information obtained by the posture sensor, in order to rotate the lens in the projection module to adjust an orientation of a projection by the projection module.

According to a third aspect of the disclosure, an electronic device comprising a projector is provided. The projector comprises: a projection module comprising a lens for projection, and a motor, wherein the motor is operable to rotate the lens of the projection module, in order to adjust an orientation of a projection by the projection module.

DETAILED DESCRIPTION

Figure 1A:
FIG. 1A is a first schematic diagram illustrating the usage mode of an electronic device in the related art of an embodiment of the disclosure.
Figure 1B:
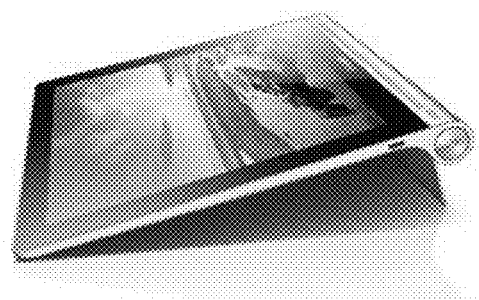
FIG. 1B is a second schematic diagram illustrating the usage mode of an electronic device in the related art of an embodiment of the disclosure.
Figure 1C:
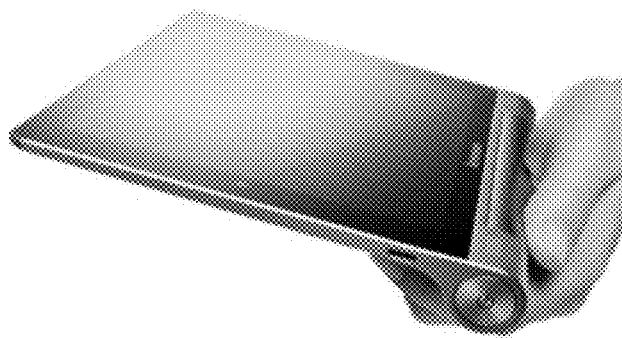
FIG. 1C is a third schematic diagram illustrating the usage mode of an electronic device in the related art of an embodiment of the disclosure.
Figure 2A:
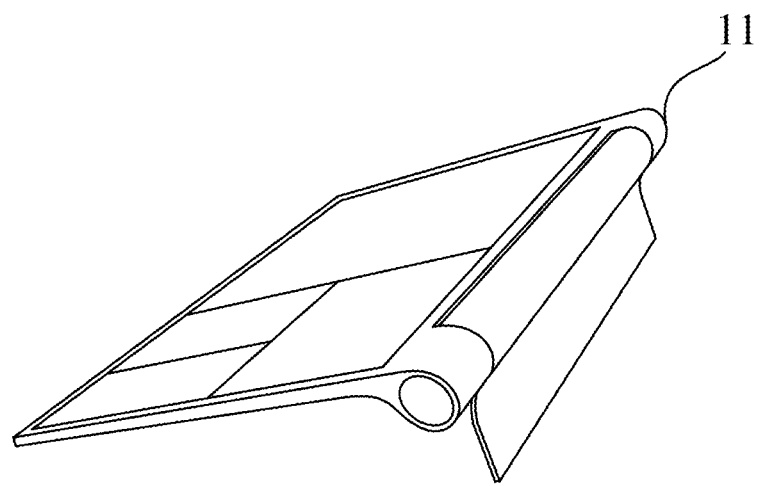
FIG. 2A is a schematic diagram illustrating the light emission location in a projector in the related art of an embodiment of the disclosure.
Figure 2B:
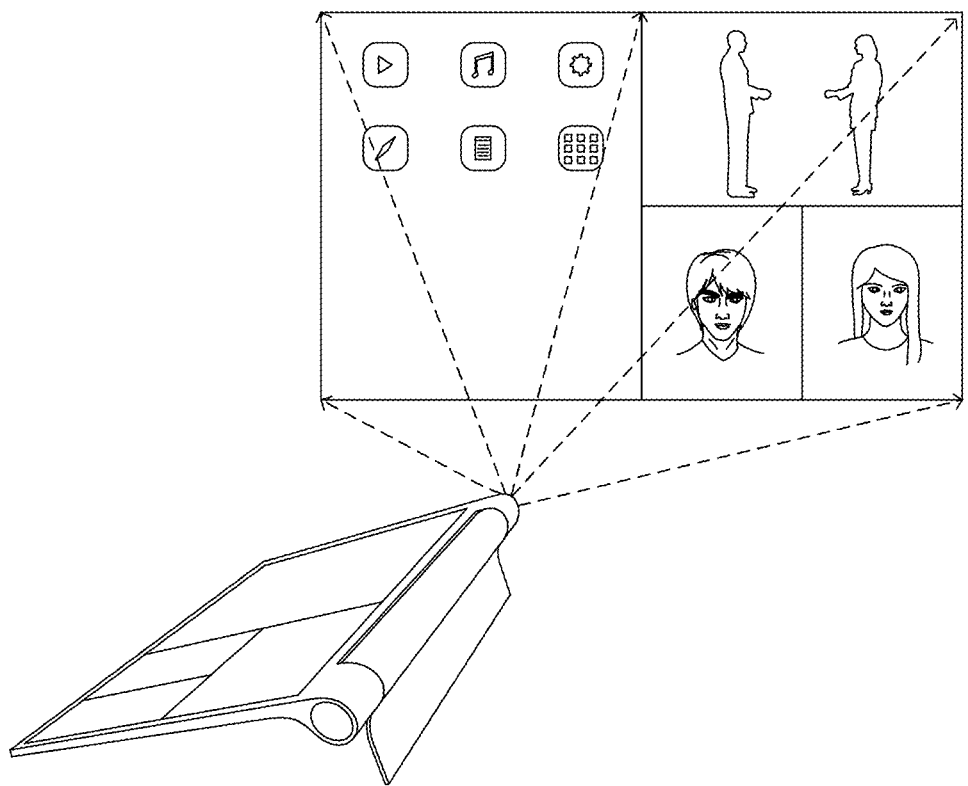
FIG. 2B is a projection schematic diagram for a projector in a proper usage mode in the related art of an embodiment of the disclosure.
Figure 2C:
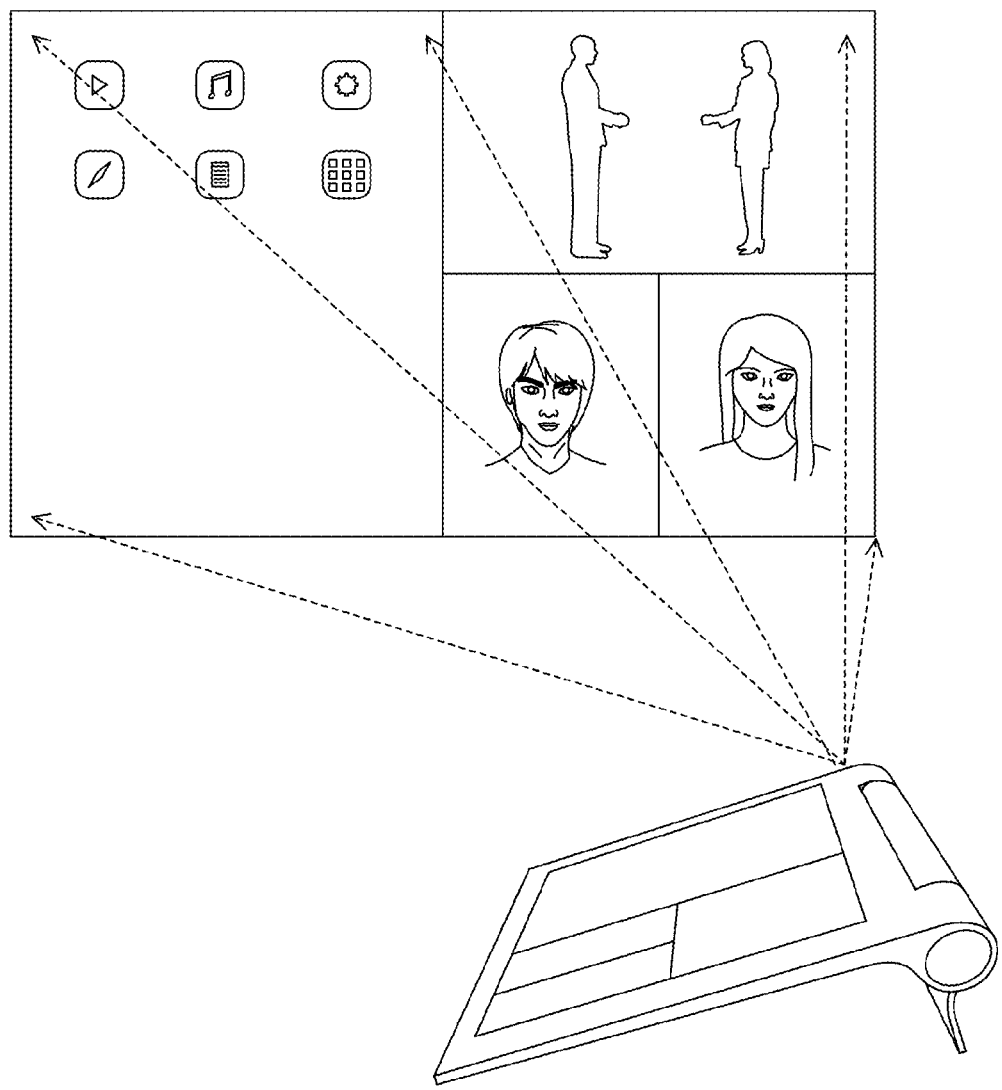
FIG. 2C is a projection schematic diagram for a projector in a improper usage mode in the related art of an embodiment of the disclosure.

The technical problem described above in the BACKGROUND section will be set forth below, taking a certain type of tablet computer as an example. This tablet computer has various usage modes such as a standing-up mode as shown in FIG. 1A, touching mode as shown in FIG. 1B, and a reading mode as shown in FIG. 1C. Assuming that the light emission location of a projector of the tablet computer is located at one end 11 of a rotor axis as shown in FIG. 2A, the tablet computer cannot achieve the best projection effect in all of its usage modes. For example, assume the projector is designed as being used by the user when the tablet computer is in its touch mode, as shown in FIG. 2B. The projector of this tablet computer may be used well in the touch mode, thereby achieving a good projection screen. The projection effect, however, is undesirable when a user uses the projection function with the tablet computer in the standing-up mode. As shown in FIG. 2C, as compared with the screen generated by the projection in the touch mode, the screen generated by the projection at this situation has a rotation of a certain angle, such as an angel of 90° clockwise. Therefore, when the projection function is used in different usage modes, the projection area of the projector may be deflected and/or inclined with different postures of the electronic device so that the user cannot conveniently watch the projection screen.

The solutions of the disclosure will be further described in detail, in conjunction with the figures and the embodiments. It should be noted that the shapes and sizes of the structures in the figures are used to explain the embodiments of the disclosure schematically, rather than to limit the structures claimed.

The First Embodiment

Figure 3A:
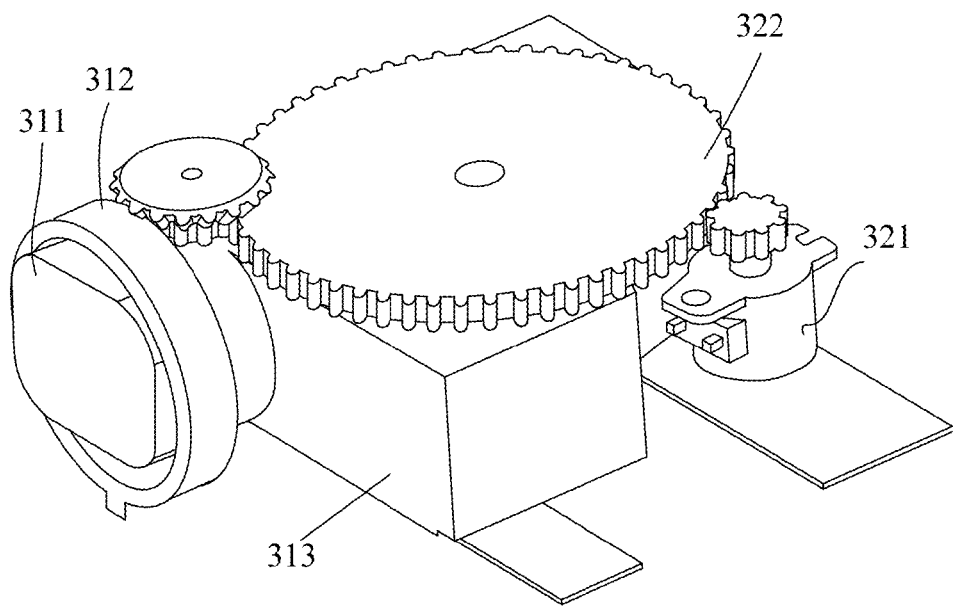
FIG. 3A is a schematic diagram illustrating the structure of a projector according to a first embodiment of the disclosure.

Based on the above technical problems, firstly, an embodiment of the disclosure provides a projector which is arranged in an electronic device. FIG. 3A is a schematic diagram illustrating the structure of a projector according to a first embodiment of the disclosure. As shown in FIG. 3A, the projector comprises a motor module and a projection module, wherein:

the projection module comprises a lens 311, a lens adjusting component 312 for adjusting the lens and a projection component 313, the projection component 313 obtaining the content to be projected, then optically converting the content to be projected to obtain a projection screen which is emitted through the lens 311;

the motor module comprises a motor 321 and a gear cluster 322, wherein the output axis of the motor is engaged with the gear cluster 322, the gear cluster 322 is engaged with the lens adjusting component 312, and the lens adjusting component 312 rotates the lens 311 to adjust an orientation of a projection by the projection module.

Figure 3B:
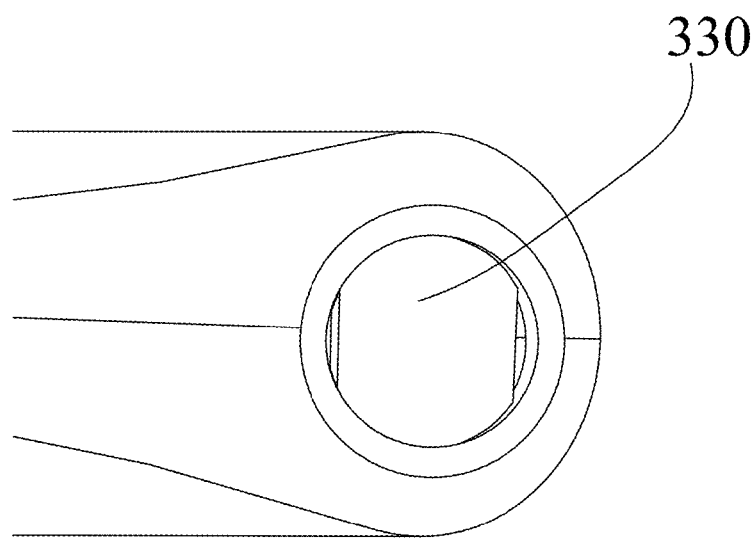
FIG. 3B is a schematic diagram illustrating the light emission location according to a first embodiment of the disclosure.

As shown in FIG. 3B, the lens 311 projects a screen via a hole 330 on the housing of the electronic device.

The electronic device herein includes various terminal devices, which may be mobile terminals or non-mobile terminals. For example, the mobile terminal comprises a Smart Phone, a tablet computer, a notebook computer, a Personal Digital Assistant (PDA), a navigator, an electronic reader, a vehicle-mounted computer, etc. The non-mobile terminal comprises a desktop computer, a table machine, a table personal computer (table PC), etc.

In the embodiment, the lens adjusting component 312 may have a shape of a ring. The inner circle of the ring is fixedly connected with the lens of the projecting module. A first end side of the ring is engaged with the second bevel gear, while a second end side of the ring faces the hole.

The second end side is opposite to the first end side.

In the embodiment of the disclosure, the projector comprises a motor module and a projection module, wherein the projection module comprises a lens, the lens projecting a screen via a hole on the housing of the electronic device; wherein the motor module comprises a motor, wherein the output axis of the motor is engaged with the gear cluster, the gear cluster is engaged with the lens adjusting component, and the lens adjusting component rotates the lens to adjust an orientation of a projection by the projection module. Accordingly, the orientation of the projection by the projection module can be adjusted according to the current status of the electronic device, thereby improving the experience of the user.

The Second Embodiment

The embodiment of the disclosure provides a projector which is arranged in an electronic device. FIG. 3A is a schematic diagram illustrating the structure of a projector according to a first embodiment of the disclosure. As shown in FIG. 3A, the projector comprises a motor module and a projection module, wherein:

the projection module comprises a lens 311, a lens adjusting component 312 for adjusting the lens and a projection component 313, the projection component 313 obtaining the content to be projected, then optically converting the content to be projected to obtain a projection screen which is emitted through the lens 311;

the motor module comprises a motor 321 and a gear cluster 322, wherein the output axis of the motor is engaged with the gear cluster 322, the gear cluster 322 is engaged with the lens adjusting component 312, and the lens adjusting component 312 rotates the lens 311 to adjust an orientation of a projection by the projection module.

As shown in FIG. 3B, the lens 311 projects a screen via a hole 330 on the housing of the electronic device.

Figure 3C:
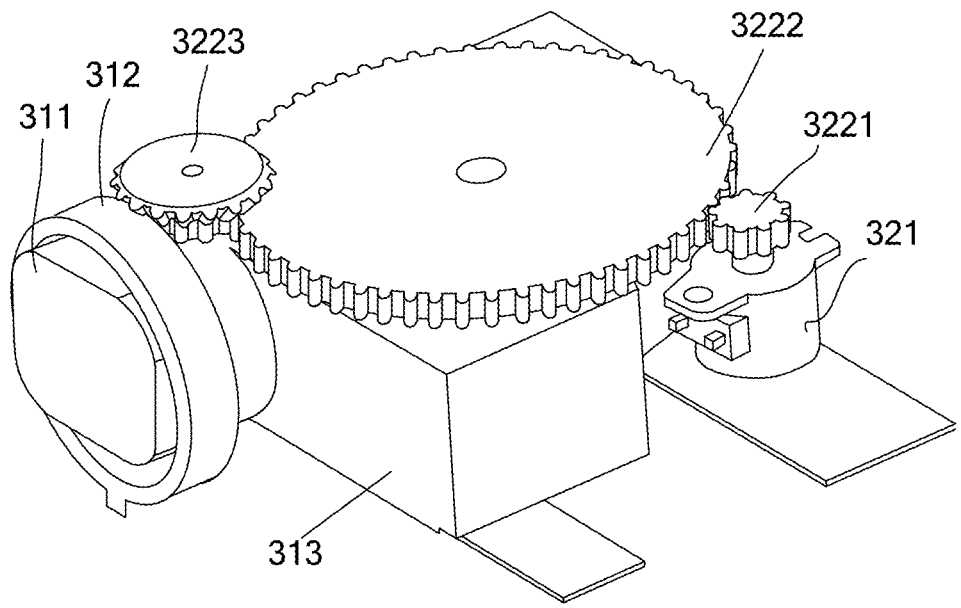
FIG. 3C is a schematic diagram illustrating the structure of a projector according to a second embodiment of the disclosure.

In the embodiment of the disclosure, as shown in FIG. 3C, the gear cluster 322 comprises a first gear 3221, a second gear 3222 and a third gear 3223. The output axis of the motor is fixedly connected with the first gear 3221, the first gear 3221 is engaged with the second gear 3222, the second gear 3222 is engaged with the third gear 3223, and the third gear 3223 is engaged with the lens adjusting component 312.

Herein, the first gear 3221 may be a bevel gear, the second gear 3222 may be a bevel gear, and the third gear 3223 may be a bevel gear.

Herein, the first gear 3221 may be a spur gear, and accordingly, the second gear 3222 may be a spur gear. It should be noted that the third gear 3223 has a special shape, a first end of which may be a spur gear for engaging the second gear and a second end of which may be a bevel gear for engaging the lens adjusting component 312.

In the embodiment, the lens adjusting component 312 may have a shape of a ring. The inner circle of the ring is fixedly connected with the lens of the projecting module. A first end side of the ring is engaged with the second bevel gear, while a second end side of the ring faces the hole.

The second end side is opposite to the first end side.

In the embodiment of the disclosure, the output axis of the motor is engaged with the gear cluster which comprises only three gears. The gear cluster is engaged with the lens adjusting component, and in turn rotates the lens to adjust an orientation of a projection by the projection module.

The Third Embodiment

The embodiment of the disclosure provides a projector which is arranged in an electronic device. FIG. 3A is a schematic diagram illustrating the structure of a projector according to a first embodiment of the disclosure. As shown in FIG. 3A, the projector comprises a motor module and a projection module, wherein:

the projection module comprises a lens 311, a lens adjusting component 312 for adjusting the lens and a projection component 313, the projection component 313 obtaining the content to be projected, then optically converting the content to be projected to obtain a projection screen which is emitted through the lens 311;

the motor module comprises a motor 321 and a gear cluster 322, wherein the output axis of the motor is engaged with the gear cluster 322, the gear cluster 322 is engaged with the lens adjusting component 312, and the lens adjusting component 312 rotates the lens 311 to adjust an orientation of a projection by the projection module.

As shown in FIG. 3B, the lens 311 projects a screen via a hole 330 on the housing of the electronic device.

Figure 3D:
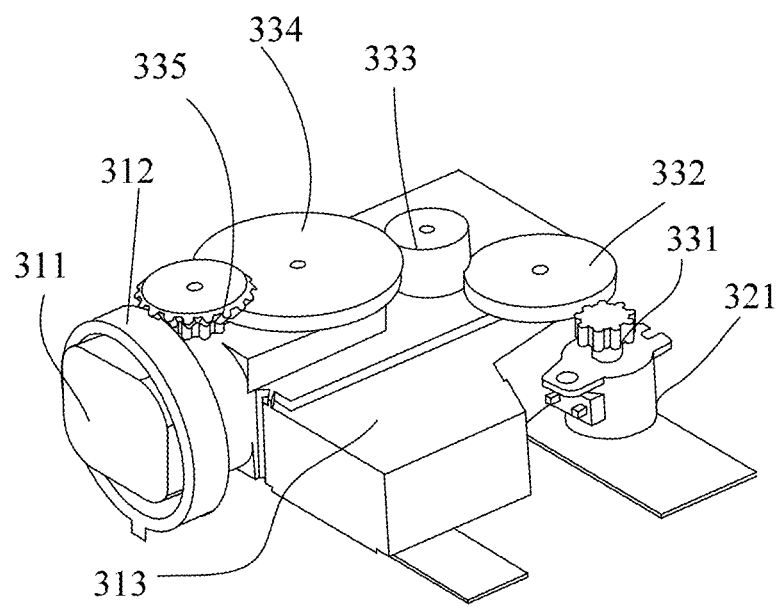
FIG. 3D is a schematic diagram illustrating the structure of a projector according to a third embodiment of the disclosure.

As shown in FIG. 3D, the gear cluster 322 comprises a fourth gear 331, a fifth gear 332, a sixth gear 333, a seventh gear 334 and a eighth gear 335, wherein:

the output axis of the motor is fixedly connected with the fourth gear 331, the fourth gear 331 is engaged with the fifth gear 332, the fifth gear 332 is engaged with a first end of the sixth gear 333, the sixth gear 333 is engaged with the seventh gear 334, the seventh gear 334 is engaged with the eighth gear 335, and the eighth gear 335 is engaged with the lens adjusting component 312.

Herein, the fourth gear 331, the fifth gear 332, the sixth gear 333, the seventh gear 334 and the eighth gear 335 may be bevel gears.

Herein, the fourth gear 331 may be a spur gear, and accordingly, the fifth gear 332 may be a spur gear. It should be specially noted that a first end 3341 of the sixth gear 333 may be of a spur gear for engaging the fifth gear 332 which is a spur gear, and that a second end 3342 of the sixth gear 333 may be of a bevel gear for engaging the seventh gear 334 which is a bevel gear.

Herein, the fourth gear 331, the fifth gear 332 and the seventh gear 334 may also be spur gears. It should be specially noted that a first end 3341 of the sixth gear 333 may be a spur gear for engaging the fifth gear 332 which is a spur gear, that a second end 3342 of the sixth gear 333 may be a spur gears for engaging seventh gear 334 which is a spur gears, that a first end of the eighth gear 335 may be a spur gear for engaging the seventh gear which is a spur gear, and that a second end of the eighth gear 335 may be a bevel gear for engaging the lens adjusting component 312.

In the embodiments as shown by FIGS. 3A to 3D, the lens adjusting component 312 may have a shape of a ring. The inner circle of the ring is fixedly connected with the lens of the projecting module. A first end side of the ring is engaged with the second bevel gear, while a second end side of the ring faces the hole.

The second end side is opposite to the first end side.

Based on the projector provided by the above embodiments, an embodiment of the disclosure further provides an electronic device comprising the projection provided by the above embodiment.

The Fourth Embodiment

Based on the projector provided by the first embodiment, an embodiment of the disclosure provided a control method applied to an electronic device. The electronic device comprises a projection module, a posture sensor and a motor module. The projection module comprises lenses for projecting. The posture sensor is used to detect posture information of the electronic device.

Figure 4:
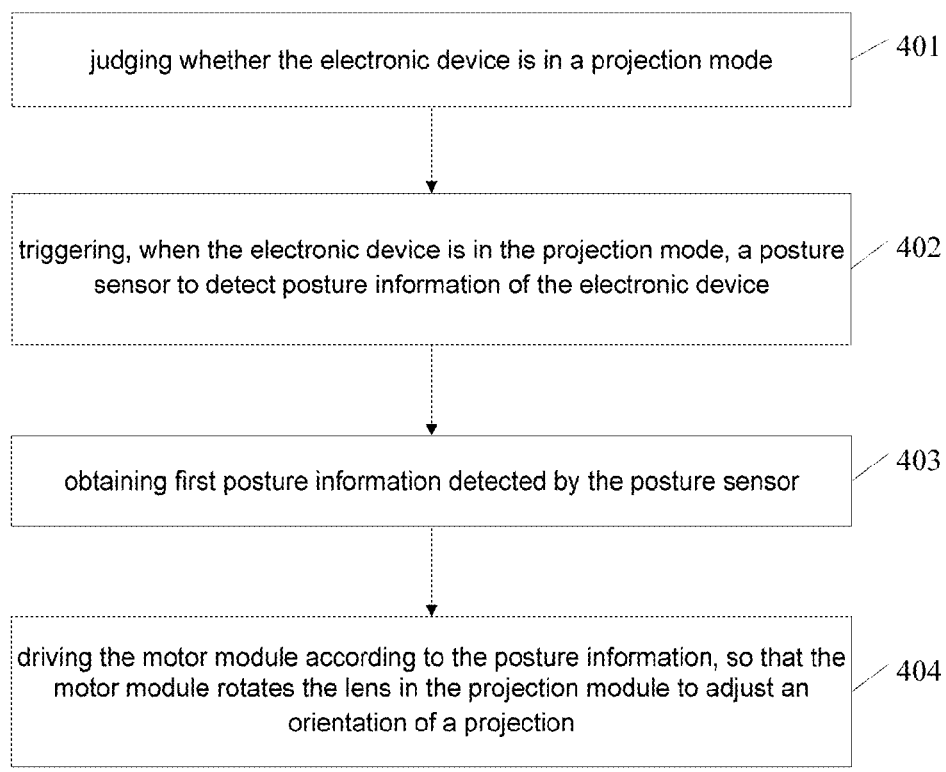
FIG. 4 is a schematic diagram illustrating the flow of the control method according to a fourth embodiment of the disclosure.

FIG. 4 is a schematic diagram illustrating the flow of the control method according to a fourth embodiment of the disclosure. As shown in FIG. 4, the method comprises the following steps.

In step 401, it is judged whether the electronic device is in a projection mode, and obtaining a first judge result.

Here, the purpose for judging whether the electronic device is in a projection mode is to judge whether the projector in the electronic device was opened by the user. When the projector is opened and is being used by the user, the electronic device is in the projection mode.

In step 402, a posture sensor is triggered to detect posture information of the electronic device when the electronic device is in the projection mode.

Here, triggering a posture sensor to detect posture information of the electronic device can be implemented by sending to the posture sensor a first command, the first command being used for triggering a posture sensor to detect posture information of the electronic device.

In step 403, first posture information detected by the posture sensor is obtained.

Here, obtaining first posture information detected by the posture sensor can be implemented by collecting the first posture information detected by the posture sensor.

In step 404, the motor module is driven according to the posture information so that the motor module rotates the lens in the projection module to adjust an orientation of a projection by the projection module.

In the embodiment of the disclosure, the posture information is orientation information. The posture information of the electronic device mainly means the posture information of the projector, or more particularly, the posture information of the lens in the projector. The step of obtaining first posture information detected by the posture sensor in Step 403 is actually a process for obtaining the special posture (x, y, z, θ) of the lens wherein x, y, z represent three directions which are orthogonal each other, and θ represents a posture (or field of view) at this point. θ may be represented by Euler angles, i.e. roll, pitch and yaw. The electronic device will not move in real time once it is fixed, therefore, x, y, z may be omitted and only θ is considered.

The control method provided by the embodiment of the disclosure first judges whether the electronic device is in a projection mode, triggers, if the electronic device is in the projection mode, a posture sensor to detect posture information of the electronic device, then obtains first posture information detected by the posture sensor, and drives the motor module according to the posture information in order to rotate the lens in the projection module to adjust the orientation of a projection by the projection module. Accordingly, the orientation of the projection by the projection module can be adjusted according to the current status of the electronic device, thereby improving the experience of the user.

The Fifth Embodiment

Based on the projector provided by the first embodiment, an embodiment of the disclosure provided a control method applied to an electronic device. The electronic device comprises a projection module, a posture sensor and a motor module. The projection module comprises lenses for projecting. The posture sensor is used to detect posture information of the electronic device.

Figure 5:
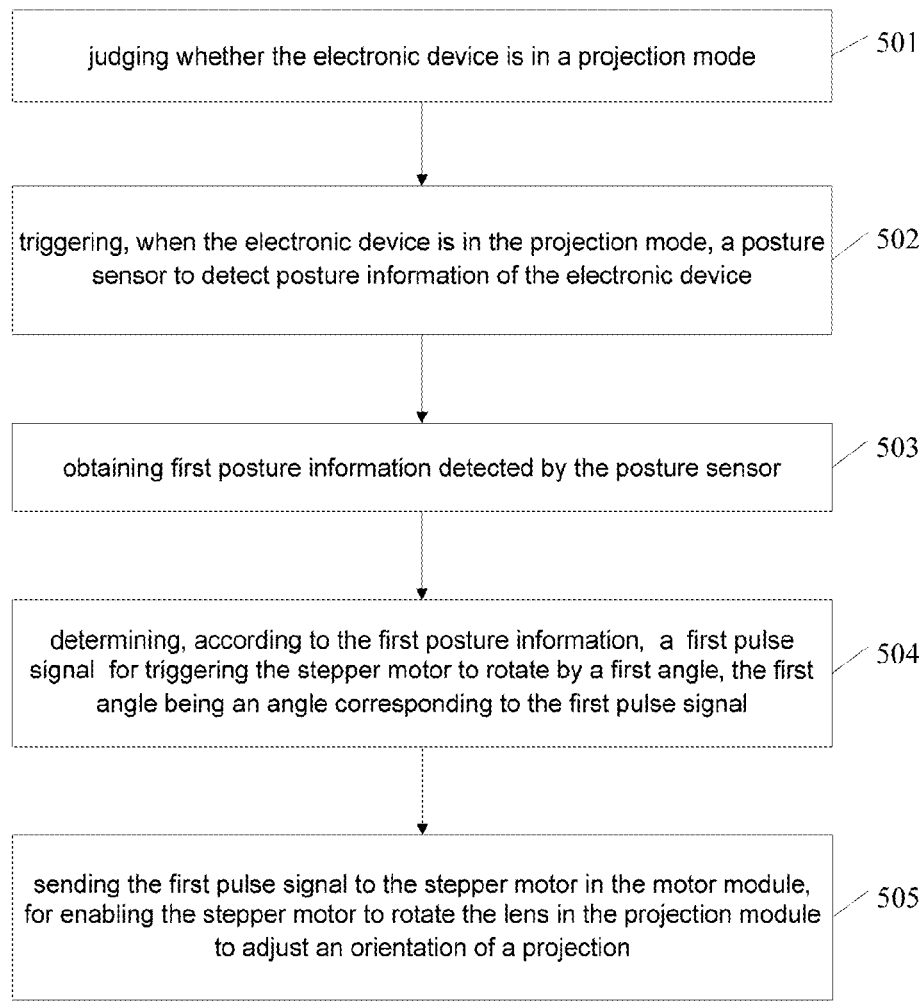
FIG. 5 is a schematic diagram illustrating the flow of the control method according to a fifth embodiment of the disclosure.

FIG. 5 is a schematic diagram illustrating the flow of the control method according to a fifth embodiment of the disclosure. As shown in FIG. 5, the method comprises the following steps.

In step 501, it is judged whether the electronic device is in a projection mode, and obtaining a first judge result.

Here, the purpose for judging whether the electronic device is in a projection mode is to judge whether the projector in the electronic device was opened by the user. When the projector is opened and is being used by the user, the electronic device is in the projection mode.

In step 502, a posture sensor is triggered to detect posture information of the electronic device when the electronic device is in the projection mode.

Here, triggering a posture sensor to detect posture information of the electronic device can be implemented by sending to the posture sensor a first command, the first command being used for triggering a posture sensor to detect posture information of the electronic device.

In step 503, first posture information detected by the posture sensor is obtained.

Here, obtaining first posture information detected by the posture sensor can be implemented by collecting the first posture information detected by the posture sensor.

Step 504, determining a first pulse signal according to the first posture information, the first pulse signal being used for triggering a stepper motor to rotate by a first angle, the first angle being an angle corresponding to the first pulse signal.

Here, the first angle can be represented by the three Euler angles i.e. roll, pitch and yaw.

In step 505, the first pulse signal is sent to the stepper motor in the motor module, for enabling the stepper motor to rotate the lens in the projection module to adjust an orientation of a projection by the projection module.

Here, determining a first pulse signal according to the first posture information comprises:
querying a first preset relationship table according to the first posture information to obtain the first pulse signal, wherein the first relationship table is a relationship table for indicating the mapping between the posture information of the electronic device and the pulse signal for driving the stepper motor.

In the embodiment of the disclosure, there are only several fixed usage modes for the electronic device. For example, as for a certain type of tablet computer, there are only three usage modes: the standing-up mode as shown in FIG. 1A, the touching mode as shown in FIG. 1B, and the reading mode as shown in FIG. 1C. Therefore, three kinds of posture information of the electronic device may be determined for the three usage modes.

Approaches such as index numbers may be used to represent the usage mode of the electronic device since only three kinds posture information exist. For example, the posture information of the electronic device is 01 when it is in the standing-up mode; the posture information of the electronic device is 02 when it is in the touching mode; and the posture information of the electronic device is 03 when it is in the reading mode. Because there are only several fixed mode for the usage mode of the electronic device, it is only needed to determine respective rotation angles of the lens for the several usage mode, e.g. the rotation angles of the lens is θ1 in case of the standing-up mode, the rotation angles of the lens is θ2 in case of the touching mode, and the rotation angles of the lens is θ3 in case of the reading mode.

The stepper motor is an open-loop controlled stepper electronic component for converting an electronic pulse signal into an angular displacement or a linear displacement. With no over-loading, the rotation speed and the stop location of the stepper motor only depend on the frequency and the pulse number of the pulse signal, irrespective of the load change. When a stepper driver receives a pulse signal, it rotates the stepper motor by a fixed angle (referred as "step angle") in a preset direction. The rotation is executed step by step with a fixed angle. As for the stepper motor, there is a pulse signal corresponding to each case when the rotation angle is θ1, θ2 or θ3. For this reason, the first relationship table in the embodiment of the disclosure is needed to be set only for the several specific usage modes: each usage mode corresponds to a rotation angle θ and a corresponding pulse signal. When the usage mode of the electronic device is known, what to be done are only querying the first relationship table to determine the corresponding pulse signal and sending the pulse signal to the stepper motor. Thereby the stepper motor can convert the pulse signal into an angular displacement, to finally drive the lens by the gear cluster provided by the first to the third embodiments and thus to implement the adjustment of the projection screen.

The Sixth Embodiment

Based on the projector provided by the embodiments, an embodiment of the disclosure provided a control method applied to an electronic device. The electronic device comprises a projection module, a posture sensor and a motor module. The projection module comprises lenses for projecting. The posture sensor is used to detect posture information of the electronic device.

Figure 6:
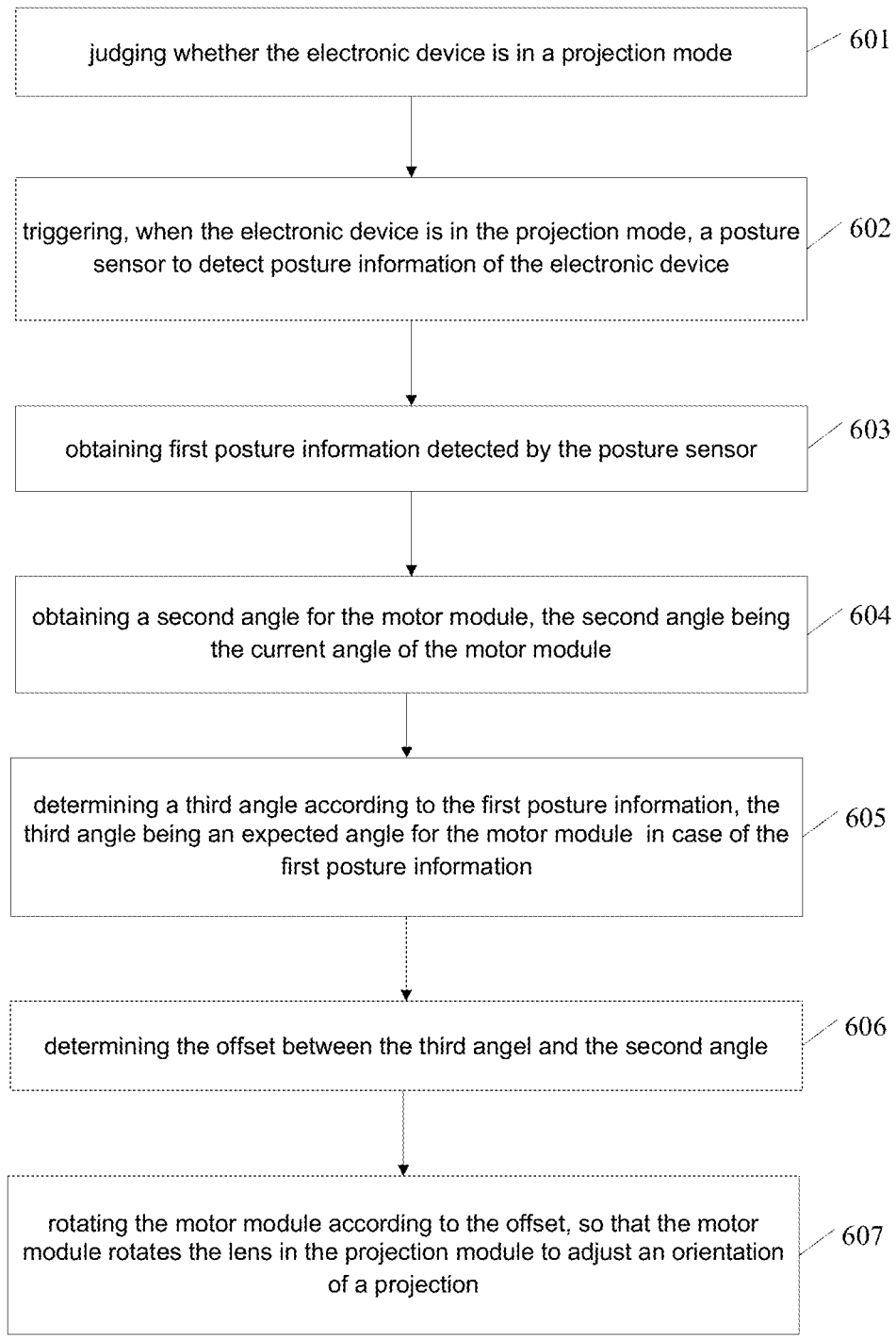
FIG. 6 is a schematic diagram illustrating the flow of the control method according to a sixth embodiment of the disclosure.

FIG. 6 is a schematic diagram illustrating the flow of the control method according to a sixth embodiment of the disclosure. As shown in FIG. 6, the method comprises the following steps.

In step 601, it is judged whether the electronic device is in a projection mode, and obtaining a first judge result.

Here, the purpose for judging whether the electronic device is in a projection mode is to judge whether the projector in the electronic device was opened by the user. When the projector is opened and is being used by the user, the electronic device is in the projection mode.

In step 602, a posture sensor is triggered to detect posture information of the electronic device when the electronic device is in the projection mode.

Here, triggering a posture sensor to detect posture information of the electronic device can be implemented by sending to the posture sensor a first command, the first command being used for triggering a posture sensor to detect posture information of the electronic device.

In step 603, first posture information detected by the posture sensor is obtained.

Here, obtaining first posture information detected by the posture sensor can be implemented by collecting the first posture information detected by the posture sensor.

In step 604, a second angle for the motor module is obtained, wherein the second angle is the current angle of the motor module.

Here, the second angle may be obtained by triggering the detection of a sensor.

In step 605, a third angle according to the first posture information is determined, wherein the third angle is an angle for the motor module needed to be rotated in case of the first posture information.

Here, determining a third angle according to the first posture information may be querying a first preset relationship table according to the first posture information and thus obtaining the third angle.

In step 606, the offset between the third angel and the second angle is determined.

In step 607, the motor module is driven to rotate according to the offset, so that the motor module rotates the lens in the projection module to adjust an orientation of a projection by the projection module.

In the embodiment of the disclosure, the second angle and the third angle are similar with the first angle, and thus their descriptions are omitted. In the example, the motor module may be a servo motor.

In the embodiment of the disclosure, there are only several fixed usage modes for the electronic device. For example, as for a certain type of tablet computer, there are only three usage modes: the standing-up mode as shown in FIG. 1A, the touching mode as shown in FIG. 1B, and the reading mode as shown in FIG. 1C. Therefore, three kinds of posture information of the electronic device may be determined for the three usage modes.

Approaches such as index numbers may be used to represent the usage mode of the electronic device since only three kinds posture information exist. For example, the posture information of the electronic device is 01 when it is in the standing-up mode; the posture information of the electronic device is 02 when it is in the touching mode; and the posture information of the electronic device is 03 when it is in the reading mode. Because there are only several fixed mode for the usage mode of the electronic device, it is only needed to determine respective rotation angles of the lens for the several usage mode, e.g. the rotation angles of the lens is θ1 in case of the standing-up mode, the rotation angles of the lens is θ2 in case of the touching mode, and the rotation angles of the lens is θ3 in case of the reading mode.

The first relationship table in the embodiment of the disclosure is needed to be set only for the several specific usage modes: each usage mode corresponds to a rotation angle θ. When the usage mode of the electronic device is known, what to be done are only querying the first relationship table to determine the corresponding rotation angle (i.e. the third angle), then determining the difference (i.e. the offset) between the current angle (i.e. the second angle) and the angle needed to be rotated (i.e. the third angle), and sending the offset to the motor. The motor finally drives the lens by the gear cluster provided by the first to the third embodiments and thus implements the adjustment of the projection screen.

The Seventh Embodiment

The above control methods are applied to an electronic device. The electronic device comprises a projection module, a posture sensor and a motor module. The projection module comprises a lens for projecting. The posture sensor is used to detect posture information of the electronic device.

Figure 7A:
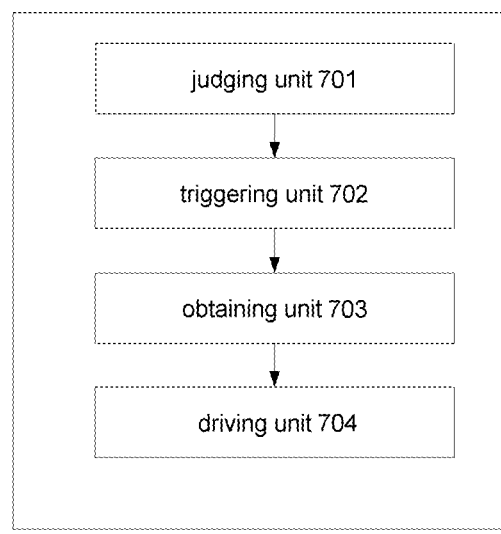
FIG. 7A is a schematic diagram illustrating the structure of an electronic device according to a seventh embodiment of the disclosure.

FIG. 7A is a schematic diagram illustrating the structure of an electronic device according to a seventh embodiment of the disclosure. As shown in FIG. 7A, the electronic device comprises: a judging unit 701, a triggering unit 702, an obtaining unit 703 and a driving unit 704, wherein the judging unit 701 is configured for judging whether the electronic device is in a projection mode, and obtaining a first judge result;

the triggering unit 702 is configured for triggering, when the electronic device is in the projection mode, a posture sensor to detect posture information of the electronic device;

the obtaining unit is configured for obtaining first posture information detected by the posture sensor; and the driving unit 704 is configured for driving the motor module according to the posture information detected by the posture sensor so that the motor module rotates the lens in the projection module to adjust an orientation of a projection by the projection module.

Figure 7B:
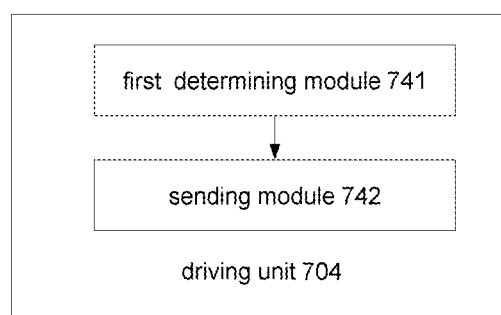
FIG. 7B is a first schematic diagram illustrating the structure of a driving unit according to a seventh embodiment of the disclosure.

In the embodiment of the disclosure, as shown in FIG. 7B, the motor module comprises a stepper motor, and accordingly, the driving unit 704 comprises a pulse signal determining module 741 and a driving module 742, wherein, the pulse signal determining module 741 is configured for determining a first pulse signal according to the first posture information, the first pulse signal being used for triggering a stepper motor to rotate by a first angle, the first angle being an angle corresponding to the first pulse signal; and the driving module 742 is configured for sending the first pulse signal to the stepper motor in the motor module, for enabling the stepper motor to rotate the lens in the projection module to adjust an orientation of a projection by the projection module.

In the embodiment of the disclosure, the pulse signal determining module is configured for querying a first preset relationship table according to the first posture information to obtain the first pulse signal, wherein the first relationship table is a relationship table for indicating the mapping between the posture information of the electronic device and the pulse signal for driving the stepper motor.

Figure 7C:
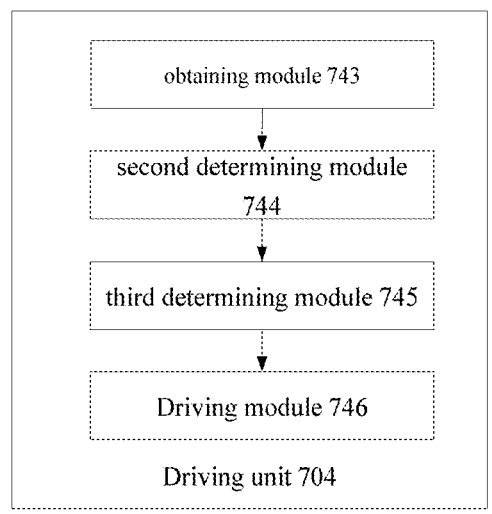
FIG. 7C is a second schematic diagram illustrating the structure of a driving unit according to a seventh embodiment of the disclosure.

In the embodiment of the disclosure, as shown in FIG. 7C, the driving unit 704 comprises a current angle obtaining module 743, an expected angle obtaining module 744, an offset determining module 745 and a driving module 746, wherein:

the current angle obtaining module 743 is configured for obtaining a second angle for the motor module, the second angle being the current angle of the motor module;

the expected angle obtaining module 744 is configured for determining a third angle according to the first posture information, the third angle being an angle for the motor module needed to be rotated in case of the first posture information;

the offset determining module 745 is configured for determining the offset between the third angel and the second angle; and the driving module 746 is configured for rotating the motor module according to the offset so as to rotate, by the motor module, the lens in the projection module to adjust an orientation of a projection by the projection module. It should be appreciated that the driving unit may constitute one or more processors.

It should be noted that the description for the electronic device embodiment of the seventh embodiment of the disclosure is similar with the above description applied to the control method embodiments and has the same advantageous effects as the method embodiments, and thus will not be described. Please refer to the description of the control method embodiments for the technical details which are not disclosed by the electronic device embodiment of the disclosure.

The Eighth Embodiment

Figure 8:
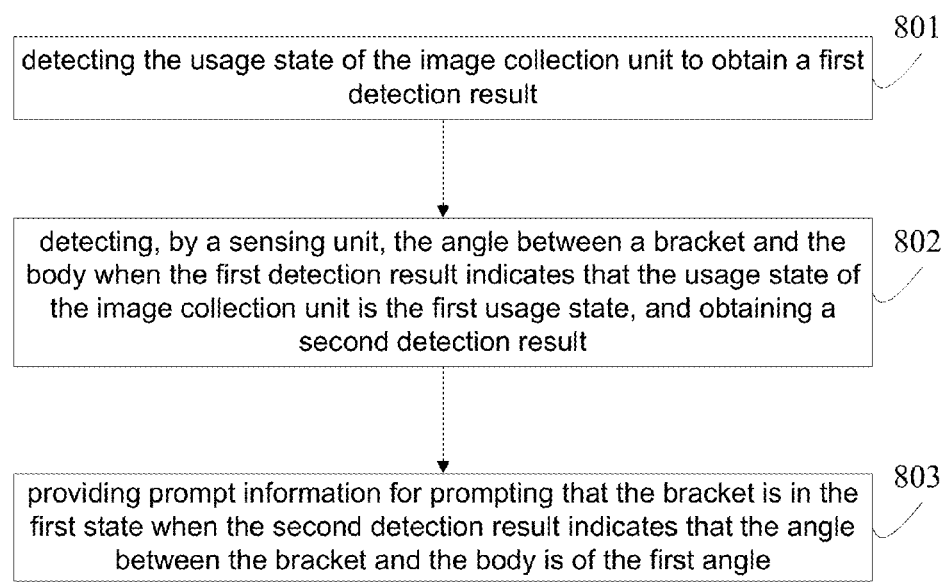
FIG. 8 is a schematic diagram illustrating the flow of the control method according to a eighth embodiment of the disclosure.

FIG. 8 is a schematic diagram illustrating the flow of the control method according to an eighth embodiment of the disclosure. The control method according the embodiment is applied to an electronic device. The electronic device comprises a body and a bracket, a touch screen being provided on a first face of the body, the bracket and an image collection unit being provided on a second face of the body. The image collection unit has a collection field of view as a first field of view. When the bracket is in a first state, the bracket is capable of maintaining a first relative position relationship of the body with respect to a supporting plane, with a first angle between the bracket and the body. The electronic device also comprises a sensing unit.

As shown in FIG. 8, the control method comprises the following steps.

In step 801, the usage state of the image collection unit is detected, and a first detection result is obtained.

In the embodiment of the disclosure, the electronic device may be an electronic device such as a mobile phone, a tablet computer, a palm computer, etc. A touch screen is provided on a first face of the body of this kind of electronic device. Here, the first face means the front face of the body. A bracket and an image collection unit are provided on a second face of the body. Here, the second face means the back face of the body. The bracket is rotatably connected to the body via a fixer.

In the embodiment of the disclosure, when the bracket is in a first state, the bracket is capable of maintaining a first relative position relationship of the body with respect to a supporting plane, with a first angle between the bracket and the body. Here the first state is the opened state. The first relative position relationship of the body with respect to a supporting plane also means that there being a first angle between the bracket and the body. Here the first state is the opened state. The first angle can be any angle in the opened state, for example, 30°, 50°, etc.

In the embodiment of the disclosure, an image collection unit (i.e. the postpositive camera) is also provided on the second face of the body. The image collection unit can collect an image of an object. The collection field of view of the image collection unit is the first field of view when it is collecting the image. Here the first field of view represents the performance of the image collection unit. The image collection unit with a better performance has a larger first field of view. The first field of the view may be 120°, 150°, etc.

In the embodiment of the disclosure, the image collection unit may be provided at a location near the bracket. Therefore, when the bracket is opened, it will appear in the scope of the first field of view of the image collection unit.

In the embodiment of the disclosure, the electronic device also comprises a sensing unit, e.g. a Moore sensor, which can sense the state of the bracket. When the image collection unit is in its opened state and the bracket is opened, the case where the bracket appears in the scope of the first field of view of the image collection unit should be prevented. For this reason, the usage state of the image collection unit is detected first. Particularly, whether the image collection unit is in the opened state or not may be judged by a program executed on the electronic device.

In step 802, the angle between a bracket and the body is detected by using a sensing unit when the first detection result indicates that the image collection unit is in a first usage state, and a second detection result is obtained.

In the embodiment of the disclosure, the first state is the opened state. Therefore, when the first detection result indicates that the image collection unit is in the opened state, the state of the bracket (i.e. the angle between the bracket and the body) is detected by the sensing unit. Particularly, a magnetic component (e.g. a magnetic sheet) is provided on the bracket and its magnetic field intensity can be detected by the Moore sensor. The distance between the Moore sensor and the bracket varies with the change of the angle between the bracket and the body. As a result, the magnetic field intensity detected by the Moore sensor is changed. It may be prescribed that the bracket is in the opened state when the magnetic field intensity is in a certain range and that the bracket is in a closed state when the magnetic field intensity is in another range.

In step 803, prompt information for prompting that the bracket is in the first state is provided when the second detection result indicates that the angle between the bracket and the body is of the first angle.

In the embodiment of the disclosure, the bracket is in the opened state when the angle between the bracket and the body, which is detected by the sensing unit, is the first angle. At this time, prompt information for prompting that the bracket is in the opened state will be provided to prompt the user to close the bracket in order to avoid affecting the shooting of an image, which in turn improves the experience of the user. If the bracket is detected as being in the closed state, the prompt information will be closed.

The Ninth Embodiment

Figure 9:
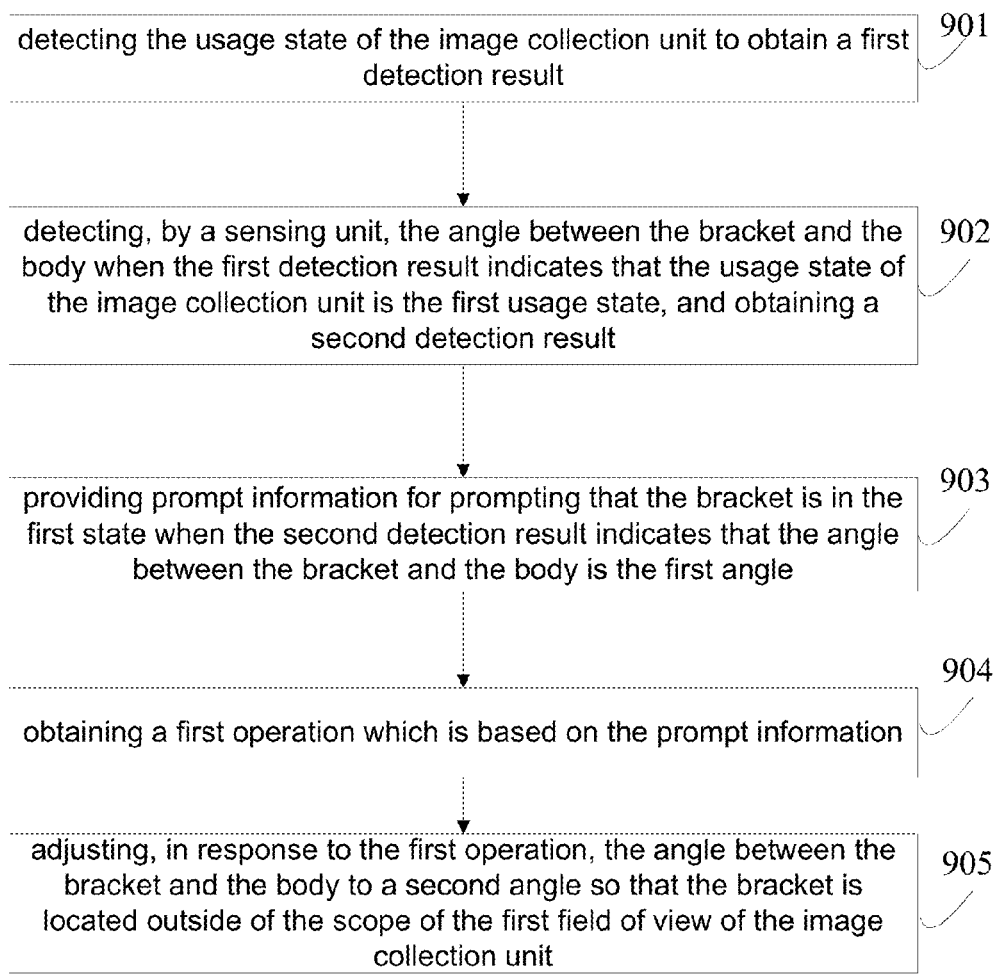
FIG. 9 is a schematic diagram illustrating the flow of the control method according to a ninth embodiment of the disclosure.

FIG. 9 is a schematic diagram illustrating the flow of the control method according to a ninth embodiment of the disclosure. The control method according the embodiment is applied to an electronic device. The electronic device comprises a body and a bracket, a touch screen being provided on a first face of the body, the bracket and an image collection unit being provided on a second face of the body. The image collection unit has a collection field of view as a first field of view. When the bracket is in a first state, the bracket is capable of maintaining a first relative position relationship of the body with respect to a supporting plane, with a first angle between the bracket and the body. The electronic device also comprises a sensing unit. As shown in FIG. 9, the control method comprises the following steps.

In step 901, the usage state of the image collection unit is detected, and a first detection result is obtained.

In the embodiment of the disclosure, the electronic device may be an electronic device such as a mobile phone, a tablet computer, a palm computer, etc. A touch screen is provided on a first face of the body of this kind of electronic device. Here, the first face means the front face of the body. A bracket and an image collection unit are provided on a second face of the body. Here, the second face means the back face of the body. The bracket is rotatably connected to the body via a fixer.

In the embodiment of the disclosure, when the bracket is in a first state, the bracket is capable of maintaining a first relative position relationship of the body with respect to a supporting plane, with a first angle between the bracket and the body. Here the first state is the opened state. The first relative position relationship of the body with respect to a supporting plane also means that there being a first angle between the bracket and the body. Here the first state is the opened state. The first angle can be any angle in the opened state, for example, 30°, 50°, etc.

In the embodiment of the disclosure, an image collection unit (i.e. the postpositive camera) is also provided on the second face of the body. The image collection unit can collect an image of an object. The collection field of view of the image collection unit is the first field of view when it is collecting the image. Here the first field of view represents the performance of the image collection unit. The image collection unit with a better performance has a larger first field of view. The first field of the view may be 120°, 150°, etc.

In the embodiment of the disclosure, the image collection unit may be provided at a location near the bracket. Therefore, when the bracket is opened, it will appear in the scope of the first field of view of the image collection unit.

In the embodiment of the disclosure, the electronic device also comprises a sensing unit, e.g. a Moore sensor, which can sense the state of the bracket. When the image collection unit is in its opened state and the bracket is opened, the case where the bracket appears in the scope of the first field of view of the image collection unit should be prevented. For this reason, the usage state of the image collection unit is detected first. Particularly, whether the image collection unit is in the opened state or not may be judged by a program executed on the electronic device.

In step 902, the angle between a bracket and the body is detected by using a sensing unit when the first detection result indicates that the usage state of the image collection unit is the first usage state, and a second detection result is obtained.

In the embodiment of the disclosure, the first state is the opened state. Therefore, when the first detection result indicates that the image collection unit is in the opened state, the state of the bracket (i.e. the angle between the bracket and the body) is detected by the sensing unit. Particularly, a magnetic component (e.g. a magnetic sheet) is provided on the bracket and its magnetic field intensity can be detected by the Moore sensor. The distance between the Moore sensor and the bracket varies with the change of the angle between the bracket and the body. As a result, the magnetic field intensity detected by the Moore sensor is changed. It may be prescribed that the bracket is in the opened state when the magnetic field intensity is in a certain range and that the bracket is in a closed state when the magnetic field intensity is in another range.

In step 903, prompt information for prompting that the bracket is in the first state is provided when the second detection result indicates that the angle between the bracket and the body is of the first angle.

In the embodiment of the disclosure, the bracket is in the opened state when the angle between the bracket and the body, which is detected by the sensing unit, is the first angle. At this time, prompt information for prompting that the bracket is in the opened state will be provided to prompt the user to close the bracket in order to avoid affecting the shooting of an image. Here the prompt information may be voice prompt information or text prompt information displayed on a touch screen. If the bracket is detected as being in the closed state, the prompt information will be closed.

In step 904, a first operation which is based on the prompt information I obtained.

In the embodiment of the disclosure, when the prompt information indicating that the bracket is in the opened state is received, the user triggers the first operation, such as adjusting the angle between the bracket and the body manually so that the bracket is located outside of the scope of the first field of view of the image collection unit to avoid affecting the shooting of an image, as shown in Step 905 below.

In step 905, in response to the first operation, the angle between the bracket and the body is adjusted to a second angle, so that the bracket is located outside of the scope of the first field of view of the image collection unit.

In the embodiment of the disclosure, the bracket is closed when both the image collection unit and the bracket are detected as being opened, so that the bracket is located outside of the scope of the first field of view of the image collection unit to avoid affecting the shooting of an image and to improve the experience of the user.

The Tenth Embodiment

Figure 10:
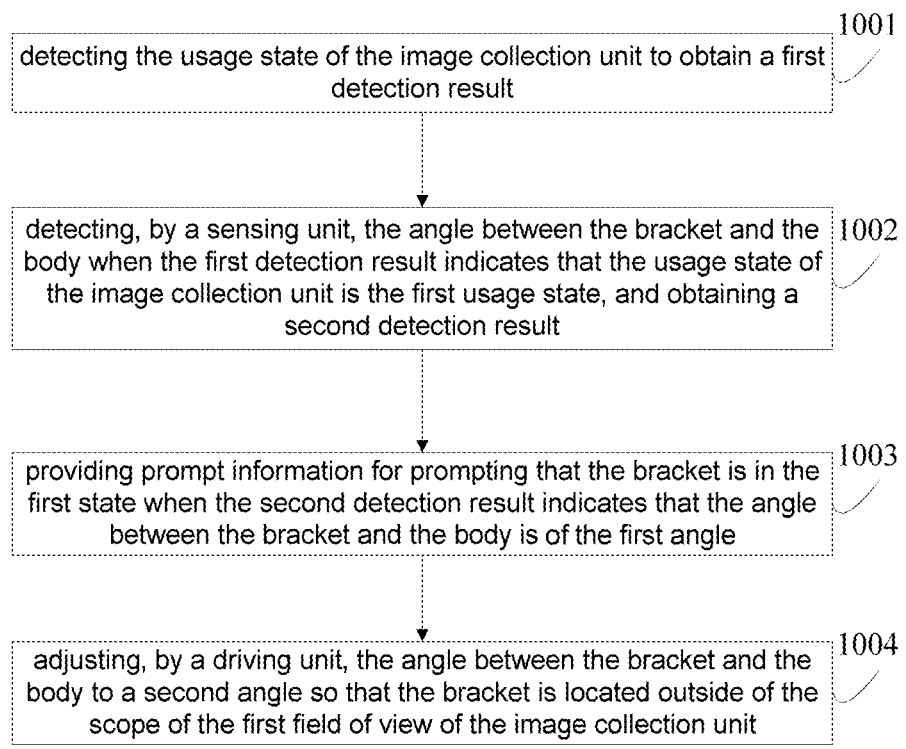
FIG. 10 is a schematic diagram illustrating the flow of the control method according to a tenth embodiment of the disclosure.

FIG. 10 is a schematic diagram illustrating the flow of the control method according to a tenth embodiment of the disclosure. The control method according the embodiment is applied to an electronic device. The electronic device comprises a body and a bracket, a touch screen being provided on a first face of the body, the bracket and an image collection unit being provided on a second face of the body. The image collection unit has a collection field of view as a first field of view. When the bracket is in a first state, the bracket is capable of maintaining a first relative position relationship of the body with respect to a supporting plane, with a first angle between the bracket and the body. The electronic device also comprises a sensing unit. As shown in FIG. 10, the control method comprises the following steps.

In step 1001, the usage state of the image collection unit is detected and a first detection result is obtained.

In the embodiment of the disclosure, the electronic device may be an electronic device such as a mobile phone, a tablet computer, a palm computer, etc. A touch screen is provided on a first face of the body of this kind of electronic device. Here, the first face means the front face of the body. A bracket and an image collection unit are provided on a second face of the body. Here, the second face means the back face of the body. The bracket is rotatably connected to the body via a fixer.

In the embodiment of the disclosure, when the bracket is in a first state, the bracket is capable of maintaining a first relative position relationship of the body with respect to a supporting plane, with a first angle between the bracket and the body. Here the first state is the opened state. The first relative position relationship of the body with respect to a supporting plane also means that there being a first angle between the bracket and the body. Here the first state is the opened state. The first angle can be any angle in the opened state, for example, 30°, 50°, etc.

In the embodiment of the disclosure, an image collection unit (i.e. the postpositive camera) is also provided on the second face of the body. The image collection unit can collect an image of an object. The collection field of view of the image collection unit is the first field of view when it is collecting the image. Here the first field of view represents the performance of the image collection unit. The image collection unit with a better performance has a larger first field of view. The first field of the view may be 120°, 150°, etc.

In the embodiment of the disclosure, the image collection unit may be provided at a location near the bracket. Therefore, when the bracket is opened, it will appear in the scope of the first field of view of the image collection unit.

In the embodiment of the disclosure, the electronic device also comprises a sensing unit, e.g. a Moore sensor, which can sense the state of the bracket. When the image collection unit is in its opened state and the bracket is opened, the case where the bracket appears in the scope of the first field of view of the image collection unit should be prevented. For this reason, the usage state of the image collection unit is detected first. Particularly, whether the image collection unit is in the opened state or not may be judged by a program executed on the electronic device.

In step 1002, the angle between a bracket and the body is detected by using a sensing unit when the first detection result indicates that the image collection unit is in a first usage state, and a second detection result is obtained.

In the embodiment of the disclosure, the first state is the opened state. Therefore, when the first detection result indicates that the image collection unit is in the opened state, the state of the bracket (i.e. the angle between the bracket and the body) is detected by the sensing unit. Particularly, a magnetic component (e.g. a magnetic sheet) is provided on the bracket and its magnetic field intensity can be detected by the Moore sensor. The distance between the Moore sensor and the bracket varies with the change of the angle between the bracket and the body. As a result, the magnetic field intensity detected by the Moore sensor is changed. It may be prescribed that the bracket is in the opened state when the magnetic field intensity is in a certain range and that the bracket is in a closed state when the magnetic field intensity is in another range.

In step 1003, prompt information for prompting that the bracket is in the first state is provided when the second detection result indicates that the angle between the bracket and the body is of the first angle.

In the embodiment of the disclosure, the bracket is in the opened state when the angle between the bracket and the body, which is detected by the sensing unit, is the first angle. At this time, prompt information for prompting that the bracket is in the opened state will be provided to prompt the user to close the bracket in order to avoid affecting the shooting of an image. Here the prompt information may be voice prompt information or text prompt information displayed on a touch screen. If the bracket is detected as being in the closed state, the prompt information will be closed.

In step 1004, the angle between the bracket and the body is adjusted to a second angle by a driving unit, so that the bracket is located outside of the scope of the first field of view of the image collection unit.

In the embodiment of the disclosure, the electronic device also comprises a driving unit such as a driving motor. When both the image collection unit and the bracket are detected as being opened, the bracket is closed directly by the driving motor, so that the bracket is located outside of the scope of the first field of view of the image collection unit to avoid affecting the shooting of an image and to improve the experience of the user.

The Eleventh Embodiment

Figure 11:
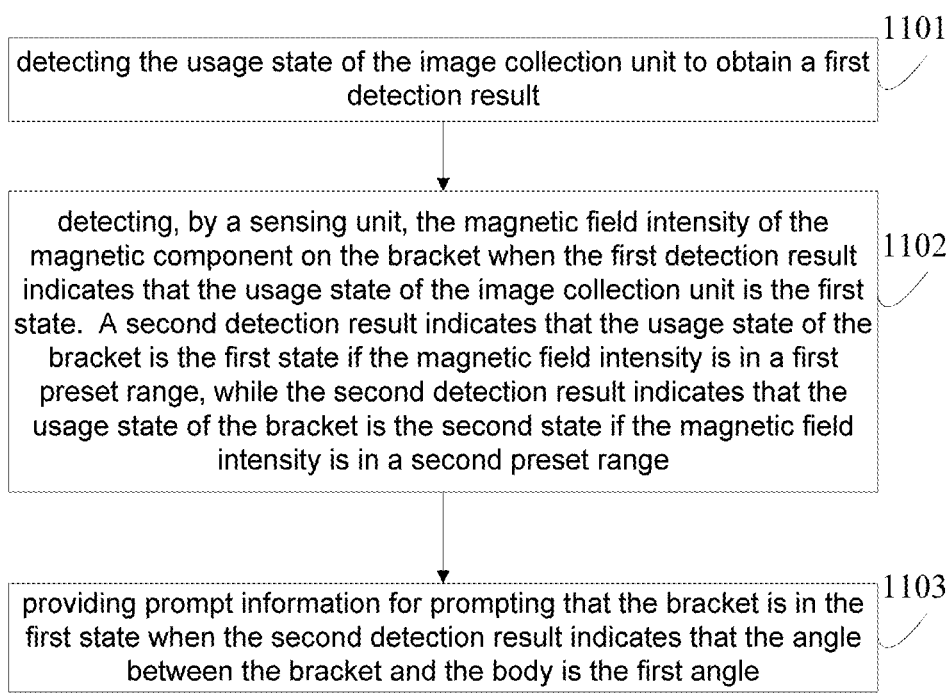
FIG. 11 is a schematic diagram illustrating the flow of the control method according to a eleventh embodiment of the disclosure.

FIG. 11 is a schematic diagram illustrating the flow of the control method according to an eleventh embodiment of the disclosure. The control method according the embodiment is applied to an electronic device. The electronic device comprises a body and a bracket, a touch screen being provided on a first face of the body, the bracket and an image collection unit being provided on a second face of the body. A magnetic component is provided on the bracket. The image collection unit has a collection field of view as a first field of view. When the bracket is in a first state, the bracket is capable of maintaining a first relative position relationship of the body with respect to a supporting plane, with a first angle between the bracket and the body. The electronic device also comprises a sensing unit. As shown in FIG. 11, the control method comprises the following steps.

Step 1101, the usage state of the image collection unit is detected and a first detection result is obtained.

In the embodiment of the disclosure, the electronic device may be an electronic device such as a mobile phone, a tablet computer, a palm computer, etc. A touch screen is provided on a first face of the body of this kind of electronic device. Here, the first face means the front face of the body. A bracket and an image collection unit are provided on a second face of the body. Here, the second face means the back face of the body. The bracket is rotatably connected to the body via a fixer.

In the embodiment of the disclosure, when the bracket is in a first state, the bracket is capable of maintaining a first relative position relationship of the body with respect to a supporting plane, with a first angle between the bracket and the body. Here the first state is the opened state. The first relative position relationship of the body with respect to a supporting plane also means that there being a first angle between the bracket and the body. Here the first state is the opened state. The first angle can be any angle in the opened state, for example, 30°, 50°, etc.

In the embodiment of the disclosure, an image collection unit (i.e. the postpositive camera) is also provided on the second face of the body. The image collection unit can collect an image of an object. The collection field of view of the image collection unit is the first field of view when it is collecting the image. Here the first field of view represents the performance of the image collection unit. The image collection unit with a better performance has a larger first field of view. The first field of the view may be 120°, 150°, etc.

In the embodiment of the disclosure, the image collection unit may be provided at a location near the bracket. Therefore, when the bracket is opened, it will appear in the scope of the first field of view of the image collection unit.

In the embodiment of the disclosure, the electronic device also comprises a sensing unit, e.g. a Moore sensor, which can sense the state of the bracket. When the image collection unit is in its opened state and the bracket is opened, the case where the bracket appears in the scope of the first field of view of the image collection unit should be prevented. For this reason, the usage state of the image collection unit is detected first. Particularly, whether the image collection unit is in the opened state or not may be judged by a program executed on the electronic device.

In step 1102, the magnetic field intensity of the magnetic component on the bracket is detected by a sensing unit, when the first detection result indicates that the usage state of the image collection unit is the first state. A second detection result indicates that the usage state of the bracket is the first state if the magnetic field intensity is in a first preset range, while the second detection result indicates that the usage state of the bracket is the second state if the magnetic field intensity is in a second preset range.

The second preset range is different from the first preset range.

In the embodiment of the disclosure, the first state is the opened state. Therefore, when the first detection result indicates that the image collection unit is in the opened state, the state of the bracket (i.e. the angle between the bracket and the body) is detected by the sensing unit. Particularly, a magnetic component (e.g. a magnetic sheet) is provided on the bracket and its magnetic field intensity can be detected by the Moore sensor. The distance between the Moore sensor and the bracket varies with the change of the angle between the bracket and the body. As a result, the magnetic field intensity detected by the Moore sensor is changed. It may be prescribed that the bracket is in the opened state when the magnetic field intensity is in a certain range and that the bracket is in a closed state when the magnetic field intensity is in another range. Here the usage state of the bracket being in the first state means that the bracket is in the opened state, while the usage state of the bracket being in the second state means that the bracket is in the closed state.

In step 1103, prompt information for prompting that the bracket is in the first state is provided when the second detection result indicates that the angle between the bracket and the body is of the first angle.

In the embodiment of the disclosure, the bracket is in the opened state when the angle between the bracket and the body, which is detected by the sensing unit, is the first angle. At this time, prompt information for prompting that the bracket is in the opened state will be provided to prompt the user to close the bracket in order to avoid affecting the shooting of an image and to improve the experience of the user. If the bracket is detected as being in the closed state, the prompt information will be closed.

The Twelfth Embodiment

Figure 12:
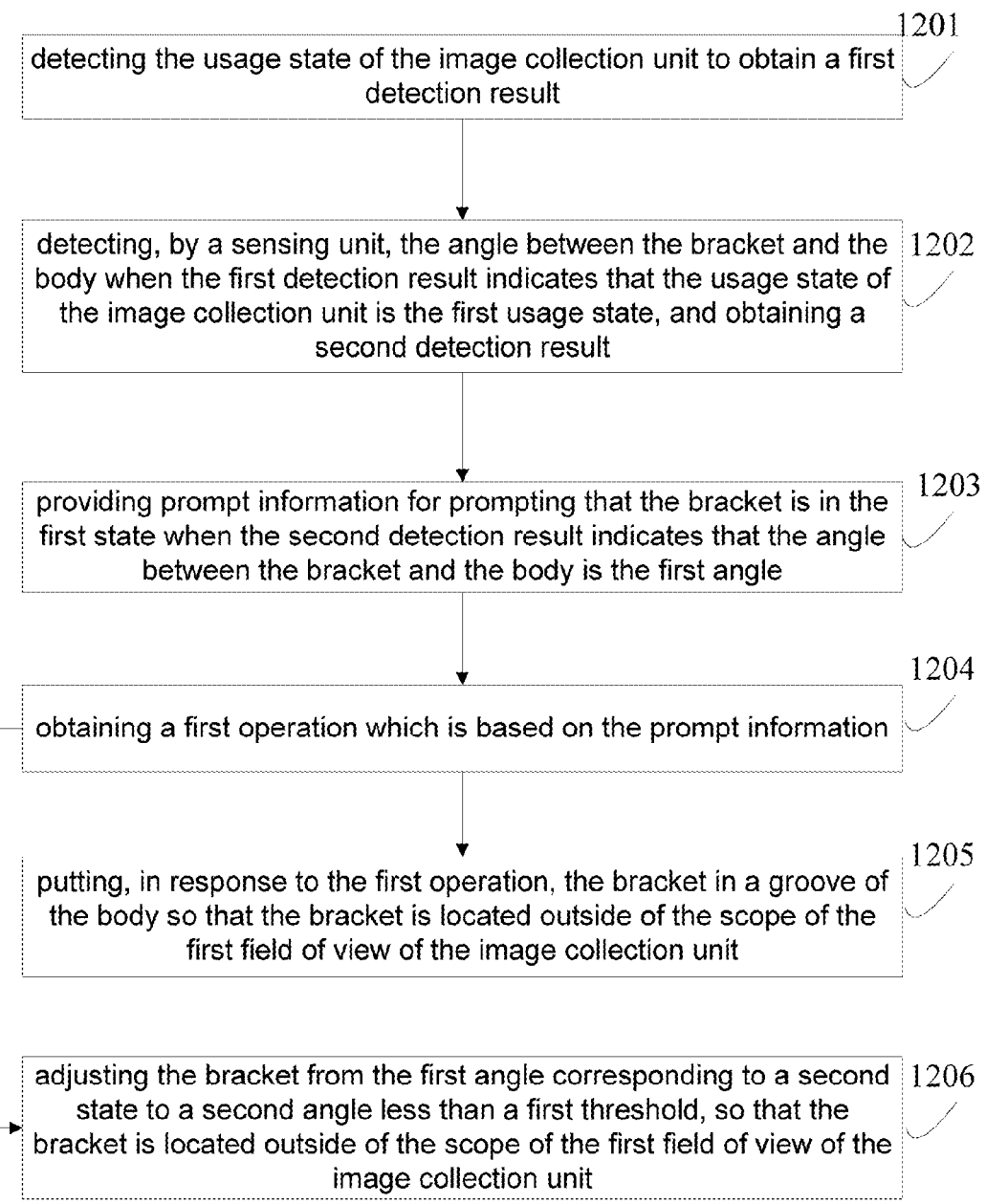
FIG. 12 is a schematic diagram illustrating the flow of the control method according to a twelfth embodiment of the disclosure.

FIG. 12 is a schematic diagram illustrating the flow of the control method according to a twelfth embodiment of the disclosure. The control method according the embodiment is applied to an electronic device. The electronic device comprises a body and a bracket, a touch screen being provided on a first face of the body, the bracket and an image collection unit being provided on a second face of the body. The image collection unit has a collection field of view as a first field of view. When the bracket is in a first state, the bracket is capable of maintaining a first relative position relationship of the body with respect to a supporting plane, with a first angle between the bracket and the body. The electronic device also comprises a sensing unit. As shown in FIG. 12, the control method comprises the following steps In step 1201, the usage state of the image collection unit is detected and a first detection result is obtained.

In the embodiment of the disclosure, the electronic device may be an electronic device such as a mobile phone, a tablet computer, a palm computer, etc. A touch screen is provided on a first face of the body of this kind of electronic device. Here, the first face means the front face of the body. A bracket and an image collection unit are provided on a second face of the body. Here, the second face means the back face of the body. The bracket is rotatably connected to the body via a fixer.

In the embodiment of the disclosure, when the bracket is in a first state, the bracket is capable of maintaining a first relative position relationship of the body with respect to a supporting plane, with a first angle between the bracket and the body. Here the first state is the opened state. The first relative position relationship of the body with respect to a supporting plane also means that there being a first angle between the bracket and the body. Here the first state is the opened state. The first angle can be any angle in the opened state, for example, 30°, 50°, etc.

In the embodiment of the disclosure, an image collection unit (i.e. the postpositive camera) is also provided on the second face of the body. The image collection unit can collect an image of an object. The collection field of view of the image collection unit is the first field of view when it is collecting the image. Here the first field of view represents the performance of the image collection unit. The image collection unit with a better performance has a larger first field of view. The first field of the view may be 120°, 150°, etc.

In the embodiment of the disclosure, the image collection unit may be provided at a location near the bracket. Therefore, when the bracket is opened, it will appear in the scope of the first field of view of the image collection unit.

In the embodiment of the disclosure, the electronic device also comprises a sensing unit, e.g. a Moore sensor, which can sense the state of the bracket. When the image collection unit is in its opened state and the bracket is opened, the case where the bracket appears in the scope of the first field of view of the image collection unit should be prevented. For this reason, the usage state of the image collection unit is detected first. Particularly, whether the image collection unit is in the opened state or not may be judged by a program executed on the electronic device.

In step 1202, the angle between a bracket and the body is detected by using a sensing unit, when the first detection result indicates that the usage state of the image collection unit is the first usage state, and a second detection result is obtained.

In the embodiment of the disclosure, the first state is the opened state. Therefore, when the first detection result indicates that the image collection unit is in the opened state, the state of the bracket (i.e. the angle between the bracket and the body) is detected by the sensing unit. Particularly, a magnetic component (e.g. a magnetic sheet) is provided on the bracket and its magnetic field intensity can be detected by the Moore sensor. The distance between the Moore sensor and the bracket varies with the change of the angle between the bracket and the body. As a result, the magnetic field intensity detected by the Moore sensor is changed. It may be prescribed that the bracket is in the opened state when the magnetic field intensity is in a certain range and that the bracket is in a closed state when the magnetic field intensity is in another range.

In step 1203, prompt information for prompting that the bracket is in the first state is provided when the second detection result indicates that the angle between the bracket and the body is the first angle.

In the embodiment of the disclosure, the bracket is in the opened state when the angle between the bracket and the body, which is detected by the sensing unit, is the first angle. At this time, prompt information for prompting that the bracket is in the opened state will be provided to prompt the user to close the bracket in order to avoid affecting the shooting of an image. Here the prompt information may be voice prompt information or text prompt information displayed on a touch screen. If the bracket is detected as being in the closed state, the prompt information will be closed.

In step 1204, a first operation is obtained, wherein the first operation is based on the prompt information. Then, Step 1205 or Step 1206 is performed.

In the embodiment of the disclosure, when the prompt information indicating that the bracket is in the opened state is received, the user triggers the first operation, such as adjusting the angle between the bracket and the body manually so that the bracket is located outside of the scope of the first field of view of the image collection unit to avoid affecting the shooting of an image, as shown in Step 1205 or Step 1206 below.

In step 1205, in response to the first operation, the bracket is put into a groove of the body so that the bracket is located outside of the scope of the first field of view of the image collection unit, and completing the procedure.

In the embodiment of the disclosure, the bracket is closed when both the image collection unit and the bracket are detected as being opened. Particularly, the bracket is taken in a groove of the body so that the bracket is located outside of the scope of the first field of view of the image collection unit to avoid affecting the shooting of an image and to improve the experience of the user.

In step 1206, the bracket is adjusted from the first angle corresponding to a second state to a second angle which is less than a first threshold so that the bracket is located outside of the scope of the first field of view of the image collection unit.

In the embodiment of the disclosure, the bracket is closed when both the image collection unit and the bracket are detected as being opened. Particularly, the bracket is adjusted from the first angle to the second angle. Here, the second angle is smaller than the first angle, for example by 10°, so that the bracket is located outside of the scope of the first field of view of the image collection unit.

The Thirteenth Embodiment

Figure 13:
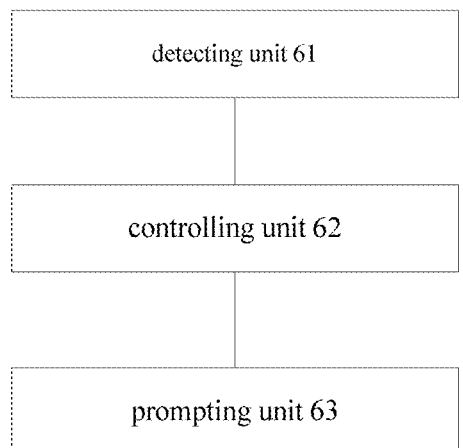
FIG. 13 is a schematic diagram illustrating the structure of an electronic device according to a thirteenth embodiment of the disclosure.

FIG. 13 is a schematic diagram illustrating the structure of an electronic device according to a thirteenth embodiment of the disclosure. The thirteenth device embodiment corresponds to the eighth method embodiment. The electronic device comprises a body and a bracket, a touch screen being provided on a first face of the body, the bracket and an image collection unit being provided on a second face of the body. The image collection unit has a collection field of view as a first field of view. When the bracket is in a first state, the bracket is capable of maintaining a first relative position relationship of the body with respect to a supporting plane, with a first angle between the bracket and the body. The electronic device also comprises a sensing unit. The electronic device further comprises:

a detecting unit 61 configured for detecting the usage state of the image collection unit and obtaining a first detection result;

a controlling unit 62 configured for controlling the sensing unit to detect the angle between a bracket and the body when the first detection result indicates that the usage state of the image collection unit is the first usage state, and obtaining a second detection result; and a prompting unit 63 configured for providing prompt information for prompting that the bracket is in the first state when the second detection result indicates that the angle between the bracket and the body is of a first angle.

One with ordinary skills in the art should understand that the functions implemented by each unit in the electronic device according the embodiment of the disclosure can be understood by referring to the descriptions for the above control methods. Each unit in the electronic device according the embodiment of the disclosure can be implemented by analog circuitry for implementing the functions according to the embodiment of the disclosure, or by running on a smart terminal the software for the functions according to the embodiment of the disclosure.

The Fourteenth Embodiment

Figure 14:
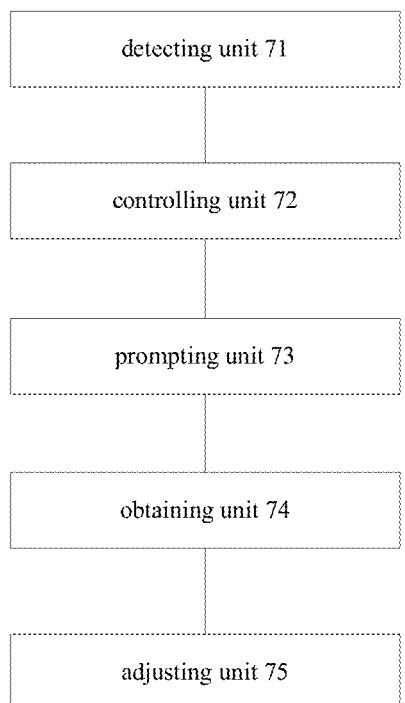
FIG. 14 is a schematic diagram illustrating the structure of an electronic device according to a fourteenth embodiment of the disclosure.

FIG. 14 is a schematic diagram illustrating the structure of an electronic device according to a fourteenth embodiment of the disclosure. The fourteenth device embodiment corresponds to the ninth method embodiment. The electronic device comprises a body and a bracket, a touch screen being provided on a first face of the body, the bracket and an image collection unit being provided on a second face of the body. The image collection unit has a collection field of view as a first field of view. When the bracket is in a first state, the bracket is capable of maintaining a first relative position relationship of the body with respect to a supporting plane, with a first angle between the bracket and the body. The electronic device also comprises a sensing unit. The electronic device further comprises:

a detecting unit 71 configured for detecting the usage state of the image collection unit and obtaining a first detection result;

a controlling unit 72 configured for controlling the sensing unit to detect the angle between a bracket and the body when the first detection result indicates that the usage state of the image collection unit is the first usage state, and obtaining a second detection result; and a prompting unit 73 configured for providing prompt information for prompting that the bracket is in the first state when the second detection result indicates that the angle between the bracket and the body is of a first angle.

Preferably, the electronic device further comprises:

an obtaining unit 74 configured for obtaining a first operation which is based on the prompting information; and an adjusting unit 75 configured for, in response to the first operation, adjusting the angle between the bracket and the body to a second angle so that the bracket is located outside of the scope of the first field of view of the image collection unit.

One with ordinary skills in the art should understand that the functions implemented by each unit in the electronic device according the embodiment of the disclosure can be understood by referring to the descriptions for the above control methods. Each unit in the electronic device according the embodiment of the disclosure can be implemented by analog circuitry for implementing the functions according to the embodiment of the disclosure, or by running on a smart terminal the software for the functions according to the embodiment of the disclosure.

The Fifteenth Embodiment

Figure 15:
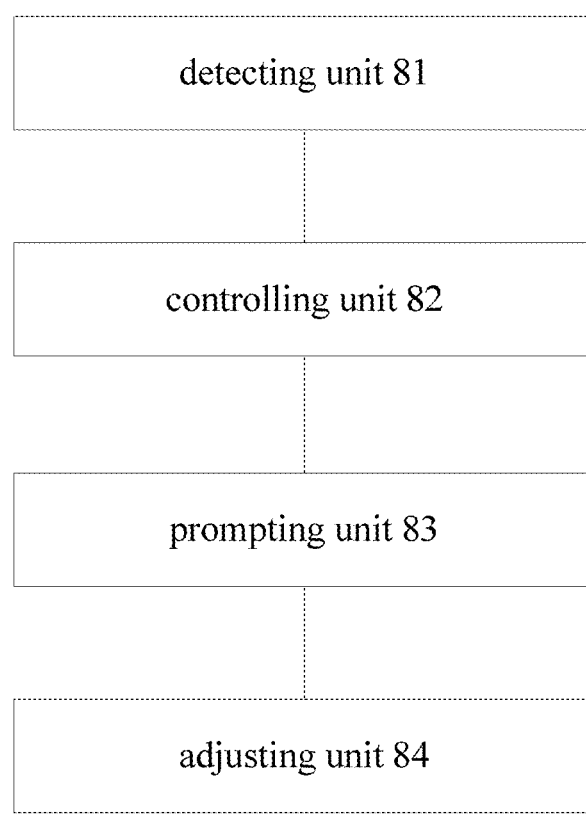
FIG. 15 is a schematic diagram illustrating the structure of an electronic device according to a fifteenth embodiment of the disclosure.

FIG. 15 is a schematic diagram illustrating the structure of an electronic device according to a fifteenth embodiment of the disclosure. The fifteenth device embodiment corresponds to the tenth method embodiment. The electronic device comprises a body and a bracket, a touch screen being provided on a first face of the body, the bracket and an image collection unit being provided on a second face of the body. The image collection unit has a collection field of view as a first field of view. When the bracket is in a first state, the bracket is capable of maintaining a first relative position relationship of the body with respect to a supporting plane, with a first angle between the bracket and the body. The electronic device also comprises a sensing unit. The electronic device further comprises:
- a detecting unit 81 configured for detecting the usage state of the image collection unit and obtaining a first detection result;
- a controlling unit 82 configured for controlling the sensing unit to detect the angle between a bracket and the body when the first detection result indicates that the usage state of the image collection unit is the first usage state, and obtaining a second detection result; and
- a prompting unit 83 configured for providing prompt information for prompting that the bracket is in the first state when the second detection result indicates that the angle between the bracket and the body is of a first angle. It should be appreciated that the detecting unit 81, the controlling unit 82 and the prompting unit 83 may constitute one or more processors.

Preferably, the electronic device further comprises a driving unit and an adjusting unit 84;
- the adjusting unit 84 configured for adjusting, by the driving unit, the angle between the bracket and the body to a second angle so that the bracket is located outside of the scope of the first field of view of the image collection unit.

One with ordinary skills in the art should understand that the functions implemented by each unit in the electronic device according the embodiment of the disclosure can be understood by referring to the descriptions for the above control methods. Each unit in the electronic device according the embodiment of the disclosure can be implemented by analog circuitry for implementing the functions according to the embodiment of the disclosure, or by running on a smart terminal the software for the functions according to the embodiment of the disclosure.

The Sixteenth Embodiment

Figure 16:
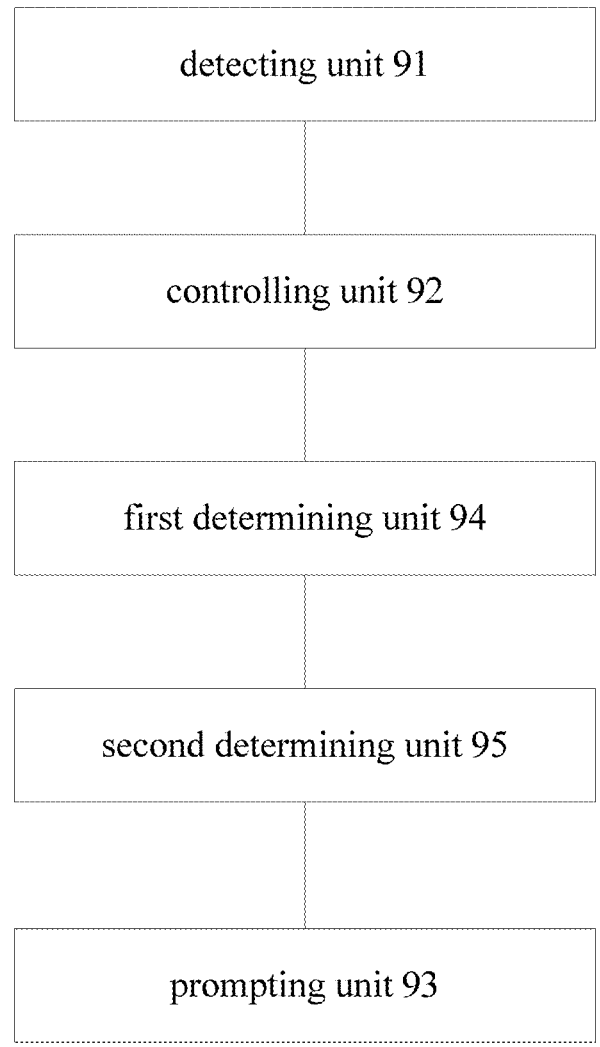
FIG. 16 is a schematic diagram illustrating the structure of an electronic device according to a sixteenth embodiment of the disclosure.

FIG. 16 is a schematic diagram illustrating the structure of an electronic device according to a sixteenth embodiment of the disclosure. The sixteenth device embodiment corresponds to the eleventh method embodiment. The electronic device comprises a body and a bracket, a touch screen being provided on a first face of the body, the bracket and an image collection unit being provided on a second face of the body. The image collection unit has a collection field of view as a first field of view. When the bracket is in a first state, the bracket is capable of maintaining a first relative position relationship of the body with respect to a supporting plane, with a first angle between the bracket and the body. The electronic device also comprises a sensing unit. The electronic device further comprises:
- a detecting unit 91 configured for detecting the usage state of the image collection unit and obtaining a first detection result;
- a controlling unit 92 configured for controlling the sensing unit to detect the angle between a bracket and the body when the first detection result indicates that the usage state of the image collection unit is the first usage state, and obtaining a second detection result; and
- a prompting unit 93 configured for providing prompt information for prompting that the bracket is in the first state when the second detection result indicates that the angle between the bracket and the body is of a first angle.

Preferably, a magnetic component is provided on the bracket. Accordingly, the controlling unit 92 is further configured for controlling the sensing unit to detect the magnetic field intensity of the magnetic component on the bracket.

The electronic device further comprises:
- a first determination unit configured for determining that the usage state of the bracket is the first state when the magnetic field intensity is within a first preset range; and
- a second determination unit configured for determining that the usage state of the bracket is the second state when the magnetic field intensity is within a second preset range, wherein the second preset range is different from the first preset range.

One with ordinary skills in the art should understand that the functions implemented by each unit in the electronic device according the embodiment of the disclosure can be understood by referring to the descriptions for the above control methods. Each unit in the electronic device according the embodiment of the disclosure can be implemented by analog circuitry for implementing the functions according to the embodiment of the disclosure, or by running on a smart terminal the software for the functions according to the embodiment of the disclosure.

The Seventh Embodiment

Figure 17:
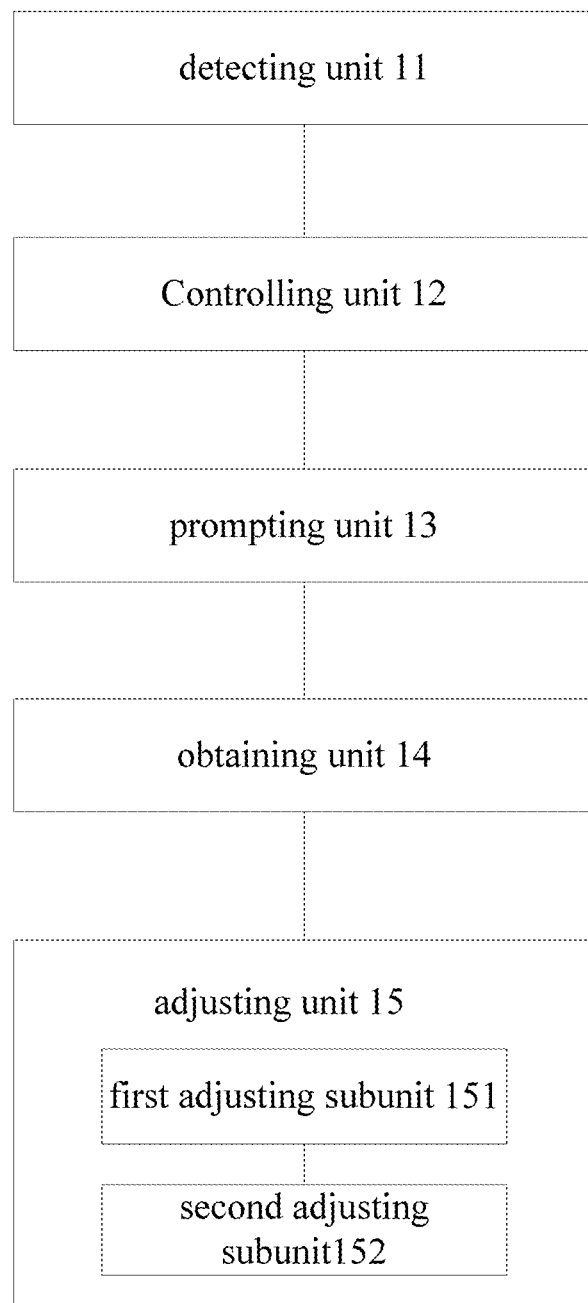
FIG. 17 is a schematic diagram illustrating the structure of an electronic device according to a seventeenth embodiment of the disclosure.

FIG. 17 is a schematic diagram illustrating the structure of an electronic device according to a seventh embodiment of the disclosure. The seventh device embodiment corresponds to the twelfth method embodiment. The electronic device comprises a body and a bracket, a touch screen being provided on a first face of the body, the bracket and an image collection unit being provided on a second face of the body. The image collection unit has a collection field of view as a first field of view. When the bracket is in a first state, the bracket is capable of maintaining a first relative position relationship of the body with respect to a supporting plane, with a first angle between the bracket and the body. The electronic device also comprises a sensing unit. The electronic device further comprises:
- a detecting unit 11 configured for detecting the usage state of the image collection unit and obtaining a first detection result;
- a controlling unit 12 configured for controlling the sensing unit to detect the angle between a bracket and the body when the first detection result indicates that the image collection unit is in the first usage state, and obtaining a second detection result; and
- a prompting unit 13 configured for providing prompt information for prompting that the bracket is in the first state when the second detection result indicates that the angle between the bracket and the body is of a first angle.

Preferably, the electronic device further comprises:
- an obtaining unit 14 configured for obtaining a first operation which is based on the prompting information; and
- an adjusting unit 15 configured for, in response to the first operation, adjusting the angle between the bracket and the body to a second angle so that the bracket is located outside of the scope of the first field of view of the image collection unit.

Preferably, the adjusting unit 15 comprises:
- a first adjusting subunit 151 configured for taking the bracket in a groove of the body so that the bracket is located outside of the scope of the first field of view of the image collection unit; or a second adjusting subunit 152 configured for adjusting the bracket from the first angle corresponding to a second state to a second angle which is less than a first threshold so that the bracket is located outside of the scope of the first field of view of the image collection unit.

One with ordinary skills in the art should understand that the functions implemented by each unit in the electronic device according the embodiment of the disclosure can be understood by referring to the descriptions for the above control methods. Each unit in the electronic device according the embodiment of the disclosure can be implemented by analog circuitry for implementing the functions according to the embodiment of the disclosure, or by running on a smart terminal the software for the functions according to the embodiment of the disclosure.

Pluralities of embodiments of the disclosure have been described above. It should be understood that the solutions described in the embodiments of the disclosure can be combined arbitrarily if no collision occurs.

Each unit in the electronic devices according to the embodiments of the disclosure, such as the judging unit, the triggering unit, the obtaining unit and the driving unit in the electronic device, and the current angle obtaining module, the expected angle obtaining module, the offset determining module and the driving module in the driving unit, and the pulse signal determining module and the driving module in the driving unit, etc. can be implemented by a processor in the electronic device. Of course, the functions performed by the processor can also be implemented by specific logic circuitry. In a particular embodiment, the processor may be a central processing unit (CPU), a microprocessor (MPU), a digital signal processor (DSP) or a field programmable gate array (FPGA), etc. The communication terminal above may be a mobile phone, a tablet computer, etc.

It can be appreciated from the embodiments of the present application that the disclosed device and method can be implemented in alternative ways. The device embodiments as described above are illustrative only. For example, while the units have been divided in accordance with their logical functions, other divisions are possible in practice. For example, more than one unit or element can be combined or can be integrated into another system, or some features can be ignored or omitted. In addition, the coupling, direct coupling or communicative connection between various components as shown or discussed can be an indirect coupling or communicative connection via some interface, device or unit and can be electrical, mechanical or in another form.

The units described above as separated may or may not be physically separated. The components shown as units may or may not be physical units. They can be co-located or can be distributed over a number of network elements. Depending on actual requirements, some or all of the units can be selected to achieve the object of the present disclosure.

Further, all the functional units in various embodiments of the present disclosure can be integrated within one processing unit, or each of these units can be a separate unit, or two or more units can be integrated into one unit. Such integrated unit can be implemented in hardware, possibly in combination with software functional units.

It may be understood by the skilled in the art that all or parts of steps for implementing the above method embodiments may be implemented by hardware associated with program instructions. The above program may be stored in a computer readable storage medium, which when executed, may perform steps of the above method embodiments. The above storage medium may comprise various media which may store program codes, such as a movable storage device, a read-only memory, a random access memory, a magnetic disc or an optical disc.

Or, if the units of the present disclosure integrated as described above are implemented in a form of software functional modules and are sold or used as a separate product, they may also be stored in a computer readable storage medium. Based on such understanding, the technical solution of the embodiment in the present disclosure may substantially, or the part of the technical solution contributing to the prior art may be embodied in a form of a software product. The computer software product is stored in a storage medium including several instructions which may be used for causing one computer device (which may be a personal computer, a server, or a network device etc.) to perform all or parts of the methods of various embodiments in the present disclosure. The storage medium as described above may comprise various media which may store program codes, such as a movable storage device, a read-only memory, a random access memory, a magnetic disc or an optical disc. In this way, the embodiments of the disclosure are not limited by a specific combination of hardware and software.

As illustrated above, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A control method applied to an electronic device, comprising:
    obtaining posture information of the electronic device using a posture sensor when the electronic device is in a projection mode; and
    driving a motor module according to the posture information obtained by the posture sensor, in order to rotate a lens in a projection module to adjust an orientation of a projection by the projection module,
    wherein the motor module comprises a stepper motor, and wherein driving the motor module according to the posture information obtained by the posture sensor comprises:
    determining, according to the posture information obtained by the posture sensor, a pulse signal for triggering the stepper motor to rotate a respective angle; and
    sending the pulse signal, as a driving signal, to the stepper motor in the motor module, in order to rotate the lens in the projection module.

2. The control method of claim 1, wherein determining, according to the posture information obtained by the posture sensor, the pulse signal for triggering the stepper motor to rotate a respective angle comprises:
    querying a preset relationship table according to the obtained posture information to determine the pulse signal, wherein the relationship table indicates the mapping between the posture information of the electronic device and the pulse signal for driving the stepper motor.

3. The control method of claim 1, wherein driving the motor module according to the posture information obtained by the posture sensor comprises:
    obtaining a current angle of the motor module;

determining an expected angle of the motor module according to the detected posture information;
determining the offset between the current angle and the expected angle of the motor module; and
driving the motor module to rotate according to the offset, so that the motor module rotates the lens in the projection module.

4. A control method applied to an electronic device, comprising:
obtaining posture information of the electronic device using a posture sensor when the electronic device is in a projection mode; and
driving a motor module according to the posture information obtained by the posture sensor, in order to rotate a lens in a projection module to adjust an orientation of a projection by the projection module,
wherein obtaining the posture information of the electronic device comprises:
detecting a usage state of an image collection unit in the electronic device;
detecting, by a sensing unit in the electronic device, the angle between a bracket and a body of the electronic device when the image collection unit is in a first usage state; and
providing prompt information for prompting the state of the bracket when the detected angle between the bracket and the body of the electronic device is of a first angle, wherein the first angle indicates that the bracket is located within the scope of the collection field of view of the image collection unit.

5. The control method of claim 4, further comprising:
obtaining a first operation which is based on the prompt information;
adjusting, in response to the first operation, the angle between the bracket and the body to a second angle so that the bracket is located outside of the scope of the collection field of view of the image collection unit.

6. The control method of claim 4, further comprising:
adjusting the angle between the bracket and the body to the second angle by using a driving unit in the electronic device so that the bracket is located outside of the scope of the collection field of view of the image collection unit.

7. The control method of claim 4, wherein detecting, by the sensing unit in the electronic device, the angle between the bracket and the body of the electronic device comprises:
detecting, by the sensing unit, the magnetic field intensity of a magnetic component provided on the bracket;
determining the usage state of the bracket is in a first state when the magnetic field intensity is within a first preset range; and
determining the usage state of the bracket is in a second state when the magnetic field intensity is within a second preset range, wherein the second preset range is different from the first preset range.

8. The control method of claim 4, wherein adjusting the angle between the bracket and the body to the second angle comprises:
putting the bracket in a groove of the body so that the bracket is located outside of the scope of the collection field of view of the image collection unit; or
adjusting the bracket from the first angle to a second angle less than a first threshold, so that the bracket is located outside of the scope of the collection field of view of the image collection unit.

9. An electronic device, comprising:
a projection module having a lens for projection;
a posture sensor for obtaining posture information of the electronic device;
a motor module; and
a processor configured:
to trigger the posture sensor to obtain posture information of the electronic device in a projection mode; and
to drive the motor module according to the posture information obtained by the posture sensor, in order to rotate the lens in the projection module to adjust an orientation of a projection by the projection module,
wherein the processor is further configured:
to obtain a current angle of the motor module;
to determine an expected angle of the motor module according to the obtained posture information;
to determine an offset between the current angle and the expected angle of the motor module; and
to drive the motor module to rotate according to the offset, in order to rotate the lens in the projection module.

10. The electronic device of claim 9, wherein the motor module comprises a stepper motor, and wherein the processor is further configured:
to determine, according to the posture information obtained by the posture sensor, a pulse signal for triggering the stepper motor to rotate a respective angle; and
to send the pulse signal, as a driving signal, to the stepper motor in the motor module, in order to rotate the lens in the projection module.

11. The electronic device of claim 9, wherein the processor is further configured to query a preset table of the mapping relationship between the posture information and the pulse signal according to the obtained posture information.

12. The electronic device of claim 9, wherein
the motor module comprises a motor and a gear cluster,
wherein an output axis of the motor is engaged with the gear cluster, the gear cluster being engaged with a lens adjusting component, in order to rotate the lens.

13. The electronic device of claim 12, wherein the gear cluster comprises a first gear, a second gear and a third gear;
wherein the output axis of the motor is fixedly connected with the first gear, the first gear is engaged with the second gear, the second gear is engaged with the third gear, and the third gear is engaged with the lens adjusting component.

14. The electronic device of claim 12, wherein the gear cluster comprises a fourth gear, a fifth gear, a sixth gear, a seventh gear and a eighth gear;
wherein the output axis of the motor is fixedly connected with the fourth gear, the fourth gear is engaged with the fifth gear, the fifth gear is engaged with a first end of the sixth gear, the sixth gear is engaged with the seventh gear, the seventh gear is engaged with the eighth gear, and the eighth gear is engaged with the lens adjusting component.

15. The electronic device of claim 12, wherein the lens adjusting component has a shape of a ring, the inner circle of the ring being fixedly connected with the lens of the projecting module, a first end side of the ring being engaged with a bevel gear of the gear cluster, while a second end side of the ring facing the hole; and
wherein the second end side is opposite to the first end side.

16. The electronic device according to claim 9, further having a body and a bracket, a touch screen being provided on a first face of the body, the bracket and an image collection unit being provided on a second face of the body, the image collection unit having a collection field of view, wherein when the bracket is in a first state, the bracket is capable of maintaining a first relative position relationship of the body with respect to a supporting plane, with a first angle between the bracket and the body; and wherein the electronic device also comprises a sensing unit, the electronic device further comprising:

a detecting unit configured for detecting the usage state of the image collection unit;

a controlling unit configured for detecting, by the sensing unit, the angle between the bracket and the body when the image collection unit is in the first usage state; and a prompting unit configured for providing prompt information for prompting the state of the bracket when the detected angle between the bracket and the body is of the first angle.

17. The electronic device of claim 16, wherein the processor is further configured to obtain a first operation which is based on the prompt information; and the electronic device further comprising a bracket adjusting unit for adjusting, in response to the first operation, the angle between the bracket and the body to a second angle so that the bracket is located outside of the scope of the collection field of view of the image collection unit.

* * * * *